United States Patent
Kaneko et al.

(10) Patent No.: US 7,501,545 B2
(45) Date of Patent: Mar. 10, 2009

(54) FLUORINE-CONTAINING 3,5-OXO-1,6-HEPTADIENE DERIVATIVE AND METHOD OF PRODUCING THE SAME

(75) Inventors: Yushi Kaneko, Shizuoka (JP); Naoyuki Hanaki, Minami-ashigara (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 11/717,144

(22) Filed: Mar. 13, 2007

(65) Prior Publication Data

US 2007/0244281 A1 Oct. 18, 2007

(30) Foreign Application Priority Data

Mar. 14, 2006 (JP) ............................. 2006-069882

(51) Int. Cl.
*C07C 43/30* (2006.01)

(52) U.S. Cl. ..................................................... 568/596

(58) Field of Classification Search ........................ None
See application file for complete search history.

(56) References Cited

U.S. PATENT DOCUMENTS 5,589,557 A 12/1996 Navarrini et al.

*Primary Examiner*—Paul A Zucker

(74) *Attorney, Agent, or Firm*—Birch, Stewart, Kolasch & Birch, LLP

(57) ABSTRACT

A method of producing a compound represented by formula (IV), having: subjecting a compound of formula (I) to fluorination, subjecting the resultant compound to at least one of thermal decomposition and hydrolysis, and subjecting the resultant compound to thermal decomposition, to obtain the compound of formula (IV):

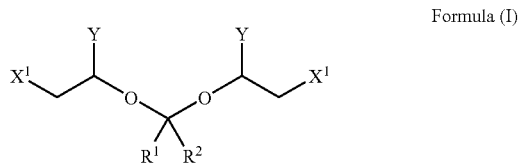

Formula (I)

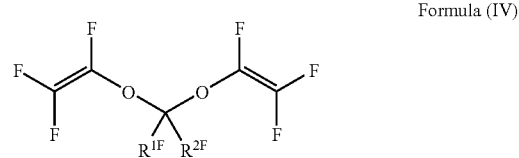

Formula (IV)

in which $R^1$ and $R^2$ each independently are a hydrogen atom, a halogen atom, or a substituent; $X^1$ is a hydrogen atom or a halogen atom, Y is an alkoxycarbonyl group or —$CH_2OCOR^3$, $R^3$ is a substituent, and $R^{1F}$ and $R^{2F}$ each independently are a halogen atom or a fluorine-containing group.

2 Claims, No Drawings

FLUORINE-CONTAINING 3,5-OXO-1,6-HEPTADIENE DERIVATIVE AND METHOD OF PRODUCING THE SAME

FIELD OF THE INVENTION

The present invention relates to a fluorine-containing compound and a method of producing the same. In particular, the present invention relates to a fluorine-containing 3,5-oxo-1,6-heptadiene derivative and a method of producing the same.

BACKGROUND OF THE INVENTION

Fluorine-containing compounds have a peculiar chemical stability, a low permittivity, a low refractive index, a lubricity, a repellency and lipophobicity, and noncohesiveness. Owing to these characteristics, the fluorine-containing compounds have been applied to various materials, such as fluorine rubbers, plenum cables, optical fibers, antireflection films, and pellicle materials. Thus, development of fluorine-containing monomers has been actively conducted in recent years. As one of the fluorine-containing monomer, there is an acetal-type fluorine-containing diene, $CF_2=CF-O-CF_2-O-CF=CF_2$ (see U.S. Pat. No. 5,589,557). It is reported that the monomer undergoes cyclic polymerization without gelation, and that the thus-obtained polymer is excellent in transparency, solubility in solvents, chemical stability, and thermal stability.

However, the above-described production of the monomer employs $CF_2(OF)_2$ having an explosive OF bond, which resultantly causes a problem in safety. Further, a reaction of $CF_2(OF)_2$ with an alkene necessitates an extremely low temperature ($-50°$ C. to $-90°$ C.) and the reaction is considerably low in selectivity, which results in low yield. Therefore, the above-described production lucks suitability as a producing method. Further, in the producing method described in U.S. Pat. No. 5,589,557, there is also such a problem that only a compound in which a moiety sandwiched with two oxygen atoms is $-CF_2-$ can be synthesized, which limits the kind of fluorine-containing monomers that can be synthesized.

SUMMARY OF THE INVENTION

The present invention resides in a method of producing a compound represented by formula (IV), which comprises: <Step 1>, <Step 2>, and <Step 3-1>, each described below:
<Step 1> subjecting a compound represented by formula (I) to fluorination, to obtain a compound represented by formula (II);
<Step 2> subjecting the compound represented by formula (II) to at least one of thermal decomposition and hydrolysis, to obtain a compound represented by formula (III-A) or (III-B); and
<Step 3-1> subjecting the compound represented by formula (III-A) or (III-B) to thermal decomposition, to obtain the compound represented by formula (IV):

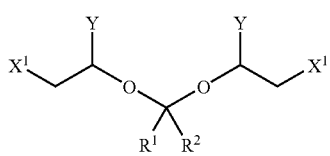

Formula (I)

wherein, in formula (I), $R^1$ and $R^2$, which are the same or different from each other, each independently represent a hydrogen atom, a halogen atom, an alkyl group, a cycloalkyl group, an alkenyl group, an alkynyl group, an aryl group, or an alkoxycarbonyl group, or $R^1$ and $R^2$ may bond together to form a ring; $X^1$ represents a hydrogen atom or a halogen atom; and Y represents an alkoxycarbonyl group, or $-CH_2OCOR^3$, in which $R^3$ represents an alkyl group, a cycloalkyl group, or an aryl group;

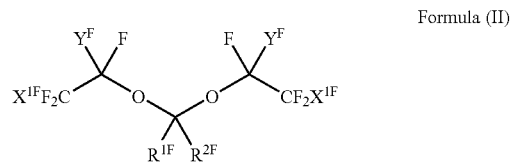

Formula (II)

wherein, in formula (II), $R^{1F}$ and $R^{2F}$, which are the same or different from each other, each independently represent a halogen atom, a fluorine-containing alkyl group, a fluorine-containing cycloalkyl group, or a fluorine-containing alkoxy group, or $R^{1F}$ and $R^{2F}$ may bond together to form a ring; $X^{1F}$ represents a halogen atom; $Y^F$ represents a fluorine-containing alkoxycarbonyl group, or $-CF_2OCOR^{3F}$, in which $R^{3F}$ represents a fluorine-containing alkyl group or a fluorine-containing cycloalkyl group; and when $X^1$, Y, $R^1$ and $R^2$ in formula (I) do not change before and after the <Step 1>, $X^{1F}$, $Y^F$, $R^{1F}$ and $R^{2F}$ have the same meanings as $X^1$, Y, $R^1$ and $R^2$ in formula (I), respectively;

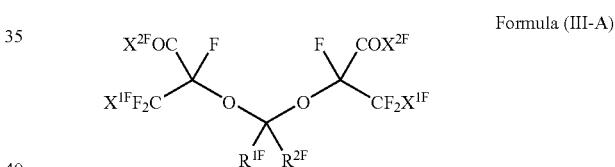

Formula (III-A)

wherein, in formula (III-A), $X^{1F}$, $R^{1F}$ and $R^{2F}$ have the same meanings as those in formula (II), respectively; $X^{1F}$ represents a halogen atom; $R^{1F}$ and $R^{2F}$, which are the same or different from each other, each independently represent a halogen atom, a fluorine-containing alkyl group, a fluorine-containing cycloalkyl group, or a fluorine-containing alkoxy group, or $R^{1F}$ and $R^{2F}$ may bond together to form a ring; and $X^{2F}$ represents a halogen atom;

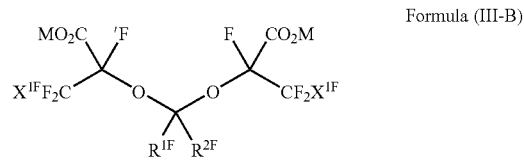

Formula (III-B)

wherein, in formula (III-B), $X^{1F}$, $R^{1F}$ and $R^{2F}$ have the same meanings as those in formula (II), respectively; $X^{1F}$ represents a halogen atom; $R^{1F}$ and $R^{2F}$, which are the same or different from each other, each independently represent a halogen atom, a fluorine-containing alkyl group, a fluorine-containing cycloalkyl group, or a fluorine-containing alkoxy group, or $R^{1F}$ and $R^{2F}$ may bond together to form a ring; and M represents a metal compound;

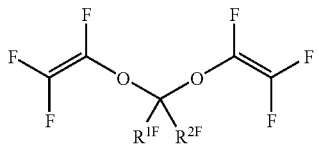

Formula (IV)

wherein, in formula (IV), $R^{1F}$ and $R^{2F}$ have the same meanings as those in formula (II), respectively, and $R^{1F}$ and $R^{2F}$, which are the same or different from each other, each independently represent a halogen atom, a fluorine-containing alkyl group, a fluorine-containing cycloalkyl group, or a fluorine-containing alkoxy group, or $R^{1F}$ and $R^{2F}$ may bond together to form a ring.

Further, the present invention resides in a method of producing a compound represented by formula (IV), which comprises: <Step 1> and <Step 3-2>, each described below:

<Step 1> subjecting the compound represented by formula (I) to fluorination, to obtain the compound represented by formula (II); and <Step 3-2> subjecting the compound represented by formula (II) to thermal decomposition, to obtain the compound represented by formula (IV).

Further, the present invention resides in a compound represented by formula (IVa):

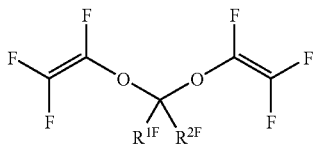

Formula (IVa)

wherein, in formula (IVa), $R^{1F}$ and $R^{2F}$, which are the same or different from each other, each independently represent a halogen atom, a fluorine-containing alkyl group, a fluorine-containing cycloalkyl group, or a fluorine-containing alkoxy group, or $R^{1F}$ and $R^{2F}$ may bond together to form a ring, but $R^{1F}$ and $R^{2F}$ each are not a fluorine atom at the same time.

Further, the present invention resides in a polymer, which comprises at least one repeating unit represented by formula (VI-1) or (VI-2), which polymer is obtained by polymerizing at least one of the compound represented by formula (IV) that is produced according to the method as described in the above, wherein a mass average molecular weight of the polymer is in the range of from 1,000 to 100,000:

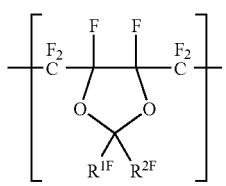

Formula (VI-1)

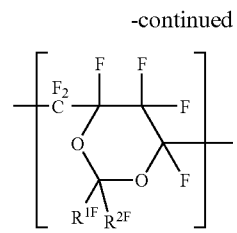

Formula (VI-2)

wherein, in formulas (VI-1) and (VI-2), $R^{1F}$ and $R^{2F}$, which are the same or different from each other, each independently represent a halogen atom, a fluorine-containing alkyl group, a fluorine-containing cycloalkyl group, or a fluorine-containing alkoxy group, or $R^{1F}$ and $R^{2F}$ may bond together to form a ring.

Other and further features and advantages of the invention will appear more fully from the following description.

DETAILED DESCRIPTION OF THE INVENTION

According to the present invention, there is provided the following means:

(1) A method of producing a compound represented by formula (IV), comprising: <Step 1>, <Step 2>, and <Step 3-1>, each described below:

<Step 1> subjecting a compound represented by formula (I) to fluorination, to obtain a compound represented by formula (II);

<Step 2> subjecting the compound represented by formula (II) to at least one of thermal decomposition and hydrolysis, to obtain a compound represented by formula (III-A) or (III-B); and <Step 3-1> subjecting the compound represented by formula (III-A) or (III-B) to thermal decomposition, to obtain the compound represented by formula (IV):

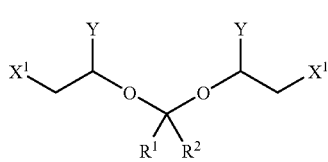

Formula (I)

wherein, in formula (I), $R^1$ and $R^2$, which are the same or different from each other, each independently represent a hydrogen atom, a halogen atom, an alkyl group, a cycloalkyl group, an alkenyl group, an alkynyl group, an aryl group, or an alkoxycarbonyl group, or $R^1$ and $R^2$ may bond together to form a ring; $X^1$ represents a hydrogen atom or a halogen atom; and Y represents an alkoxycarbonyl group, or —CH$_2$OCOR$^3$, in which $R^3$ represents an alkyl group, a cycloalkyl group, or an aryl group;

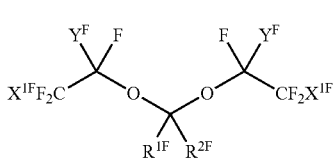

Formula (II)

wherein, in formula (II), $R^{1F}$ and $R^{2F}$, which are the same or different from each other, each independently represent a halogen atom, a fluorine-containing alkyl group, a fluorine-containing cycloalkyl group, or a fluorine-containing alkoxy group, or $R^{1F}$ and $R^{2F}$ may bond together to form a ring; $X^{1F}$ represents a halogen atom; $Y^F$ represents a fluorine-containing alkoxycarbonyl group, or $-CF_2OCOR^{3F}$, in which $R^{3F}$ represents a fluorine-containing alkyl group or a fluorine-containing cycloalkyl group; and when $X^1$, Y, $R^1$ and $R^2$ in formula (I) do not change before and after the <Step 1>, $X^{1F}$, $Y^F$, $R^{1F}$ and $R^{2F}$ have the same meanings as $X^1$, Y, $R^1$ and $R^2$ in formula (I), respectively;

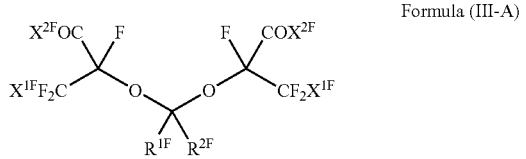

Formula (III-A)

wherein, in formula (III-A), $X^{1F}$, $R^{1F}$ and $R^{2F}$ have the same meanings as those in formula (II), respectively; $X^{1F}$ represents a halogen atom; $R^{1F}$ and $R^{2F}$, which are the same or different from each other, each independently represent a halogen atom, a fluorine-containing alkyl group, a fluorine-containing cycloalkyl group, or a fluorine-containing alkoxy group, or $R^{1F}$ and $R^{2F}$ may bond together to form a ring; and $X^{2F}$ represents a halogen atom;

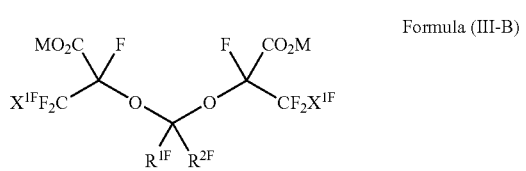

Formula (III-B)

wherein, in formula (III-B), $X^{1F}$, $R^{1F}$ and $R^{2F}$ have the same meanings as those in formula (II), respectively; $X^{1F}$ represents a halogen atom; $R^{1F}$ and $R^{2F}$, which are the same or different from each other, each independently represent a halogen atom, a fluorine-containing alkyl group, a fluorine-containing cycloalkyl group, or a fluorine-containing alkoxy group, or $R^{1F}$ and $R^{2F}$ may bond together to form a ring; and M represents a metal compound;

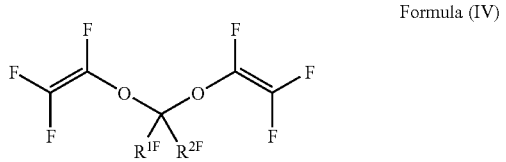

Formula (IV)

wherein, in formula (IV), $R^{1F}$ and $R^{2F}$ have the same meanings as those in formula (II), respectively, and $R^{1F}$ and $R^{2F}$, which are the same or different from each other, each independently represent a halogen atom, a fluorine-containing alkyl group, a fluorine-containing cycloalkyl group, or a fluorine-containing alkoxy group, or $R^{1F}$ and $R^{2F}$ may bond together to form a ring;

(2) A method of producing a compound represented by formula (IV), comprising: <Step 1> and <Step 3-2>, each described below:

<Step 1> subjecting a compound represented by formula (I) to fluorination, to obtain a compound represented by formula (II); and <Step 3-2> subjecting the compound represented by formula (II) to thermal decomposition, to obtain the compound represented by formula (IV):

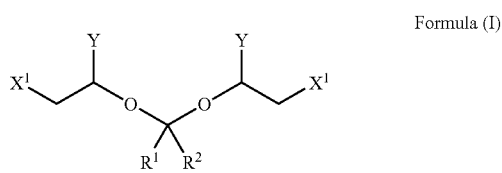

Formula (I)

wherein, in formula (I), $R^1$ and $R^2$, which are the same or different from each other, each independently represent a hydrogen atom, a halogen atom, an alkyl group, a cycloalkyl group, an alkenyl group, an alkynyl group, an aryl group, or an alkoxycarbonyl group, or $R^1$ and $R^2$ may bond together to form a ring; $X^1$ represents a hydrogen atom or a halogen atom; and Y represents an alkoxycarbonyl group, or $-CH_2OCOR^3$, in which $R^3$ represents an alkyl group, a cycloalkyl group, or an aryl group;

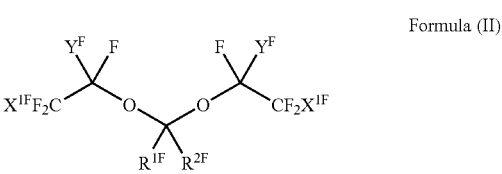

Formula (II)

wherein, in formula (II), $R^{1F}$ and $R^{2F}$, which are the same or different from each other, each independently represent a halogen atom, a fluorine-containing alkyl group, a fluorine-containing cycloalkyl group, or a fluorine-containing alkoxy group, or $R^{1F}$ and $R^{2F}$ may bond together to form a ring; $X^{1F}$ represents a halogen atom; $Y^F$ represents a fluorine-containing alkoxycarbonyl group, or $-CF_2OCOR^{3F}$, in which $R^{3F}$ represents a fluorine-containing alkyl group or a fluorine-containing cycloalkyl group; and when $X^1$, Y, $R^1$ and $R^2$ in formula (I) do not change before and after the <Step 1>, $X^{1F}$, $Y^F$, $R^{1F}$ and $R^{2F}$ have the same meanings as $X^1$, Y, $R^1$ and $R^2$ in formula (I), respectively;

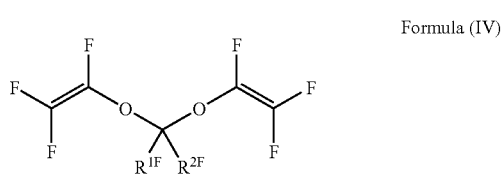

Formula (IV)

wherein, in formula (IV), $R^{1F}$ and $R^{2F}$ have the same meanings as those in formula (II), respectively, and $R^{1F}$ and $R^{2F}$, which are the same or different from each other, each independently represent a halogen atom, a fluorine-containing alkyl group, a fluorine-containing cycloalkyl group, or a fluorine-containing alkoxy group, or $R^{1F}$ and $R^{2F}$ may bond together to form a ring;

(3) A compound represented by formula (IVa):

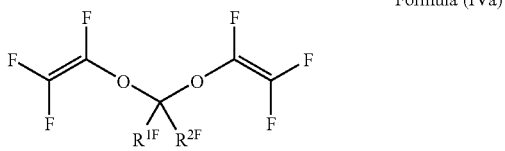

Formula (IVa)

wherein, in formula (IVa), $R^{1F}$ and $R^{2F}$, which are the same or different from each other, each independently represent a halogen atom, a fluorine-containing alkyl group, a fluorine-containing cycloalkyl group, or a fluorine-containing alkoxy group, or $R^{1F}$ and $R^{2F}$ may bond together to form a ring, but $R^{1F}$ and $R^{2F}$ each are not a fluorine atom at the same time;

(4) A polymer, comprising at least one repeating unit represented by formula (VI-1) or (VI-2), which polymer is obtained by polymerizing at least one of the compound represented by formula (IV) that is produced according to the method as described in the above item (1) or (2), wherein a mass average molecular weight of the polymer is in the range of from 1,000 to 100,000:

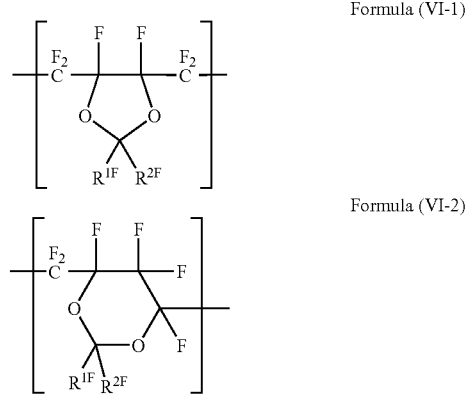

Formula (VI-1)

Formula (VI-2)

wherein, in formulas (VI-1) and (VI-2), $R^{1F}$ and $R^{2F}$, which are the same or different from each other, each independently represent a halogen atom, a fluorine-containing alkyl group, a fluorine-containing cycloalkyl group, or a fluorine-containing alkoxy group, or $R^{1F}$ and $R^{2F}$ may bond together to form a ring.

The present invention will be explained in detail below.

First, the compounds represented by any one of formulae (I), (II), (III-A), (III-B), (IV), and (IVa) each are described in detail.

In formula (I), $R^1$ and $R^2$, which are the same or different from each other, each independently represent a hydrogen atom, a halogen atom (e.g., fluorine, chlorine, bromine, iodine), an alkyl group, a cycloalkyl group, an alkenyl group, an alkynyl group, an aryl group, or an alkoxycarbonyl group, or $R^1$ and $R^2$ may bond together to form a ring.

The alkyl group represented by $R^1$ and $R^2$ is a straight or branched alkyl group, which may be an unsubstituted alkyl group or an alkyl group having a substituent. The alkyl groups are those having preferably 1 to 30 carbon atoms, more preferably 1 to 20 carbon atoms, and especially preferably 1 to 10 carbon atoms, respectively excluding carbon atoms of the substituent. Examples of the alkyl group include methyl, ethyl, n-propyl, isopropyl, t-butyl, sec-butyl, n-pentyl, n-hexyl, n-heptyl, and n-octyl groups.

Examples of the substituent (atom or group) that the alkyl group may have, include halogen atoms, groups of alkyl, cycloalkyl, alkenyl, cycloalkenyl, alkynyl, aryl, heterocyclic, cyano, hydroxyl, nitro, carboxyl, alkoxy, aryloxy, silyloxy, heterocylic oxy, acyloxy, carbamoyloxy, amino (including alkylamino and anilino), acylamino, aminocarbonylamino, alkoxycarbonylamino, aryloxycarbonylamino, sulfamonylamino, alkyl- or aryl-sulfonylamino, mercapto, alkylthio, arylthio, heterocyclic thio, sulfamoyl, sulfo, alky- or aryl-sulfinyl, alkyl- or aryl-sulfonyl, acyl, aryloxycarbonyl, alkoxycarbonyl, carbamoyl, arylazo, heterocyclic azo, imido, phosphino, phosphinyl, phosphinyloxy, phosphinylamino, and silyl.

Such a substituent on the alkyl group having a substituent is explained in detail below.

Specific examples thereof include: a halogen atom (e.g., fluorine, chlorine, bromine, iodine), an alkyl group (which means a linear or branched, substituted or unsubstituted alkyl group, and which is preferably an alkyl group having from 1 to 30 carbon atoms, e.g., methyl, ethyl, n-propyl, isopropyl, tert-butyl, n-octyl, 2-chloroethyl, 2-cyanoethyl, 2-ethylhexyl), a cycloalkyl group (preferably a substituted or unsubstituted monocyclic cycloalkyl group having 3 to 30 carbon atoms, e.g. cyclohexyl and cyclopentyl, and a polycycloalkyl group including groups composed of a polycyclic structure, such as a bicycloalkyl group (preferably a substituted or unsubstituted bicycloalkyl group having 5 to 30 carbon atoms, e.g., bicyclo[1,2,2]heptane-2-yl and bicyclo[2,2,2]octane-3-yl), and a tricycloalkyl group; more preferably a monocycloalkyl group or a bicycloalkyl group; and particularly preferably a monocyclic cycloalkyl group), an alkenyl group (preferably a straight-chain or branched-chain, and substituted or unsubstituted alkenyl group, more preferably an alkenyl group having 2 to 30 carbon atoms, e.g., vinyl, allyl, prenyl, geranyl, oleyl), a cycloalkenyl group (preferably a substituted or unsubstituted cycloalkenyl group having 3 to 30 carbon atoms, e.g., 2-cyclopentene-1-yl, and 2-cyclohexene-1-yl; and a polycycloalkenyl group such as a bicycloalkenyl group (preferably a substituted or unsubstituted bicycloalkenyl group having 5 to 30 carbon atoms, e.g., bicyclo [2,2,1]hepto-2-ene-1-yl and bicyclo[2,2,2]octo-2-ene-4-yl), and a tricycloalkenyl group, with a monocyclic cycloalkenyl group being particularly preferred), an alkynyl group (preferably a substituted or unsubstituted alkynyl group having from 2 to 30 carbon atoms, e.g., ethynyl, propargyl, trimethylsilylethynyl), an aryl group (preferably a substituted or unsubstituted aryl group having from 6 to 30 carbon atoms, e.g., phenyl, p-tolyl, naphthyl, m-chlorophenyl, o-hexadecanoylaminophenyl), a heterocyclic group (preferably a 5- to 7-membered substituted or unsubstituted, saturated or unsaturated, aromatic or non-aromatic, and monocyclic or condensed heterocyclic group, more preferably a heterocyclic group having ring-constituting atoms selected from carbon, nitrogen and sulfur atoms, and containing at least one hetero atom selected from the group consisting of nitrogen, oxygen and sulfur atoms; furthermore preferably a 5- to 6-membered aromatic heterocyclic group having 3 to 30 carbon atoms, e.g., 2-furyl, 2-thienyl, 2-pyridyl, 4-pyridyl, 2-pyrimidinyl, 2-benzothiazolyl), a cyano group, a hydroxyl group, a nitro group, a carboxyl group, an alkoxy group (preferably a substituted or unsubstituted alkoxy group having from 1 to 30 carbon atoms, e.g., methoxy, ethoxy, isopropoxy, tert-butoxy, n-octyloxy, 2-methoxyethoxy), an aryloxy group (preferably a substituted or unsubstituted aryloxy group having from 6 to 30 carbon atoms, e.g., phenoxy, 2-methylphenoxy, 2,4-di-tert-amylphenoxy, 4-tert-butylphenoxy, 3-nitrophenoxy, 2-tetradecanoylaminophenoxy), a silyloxy group (preferably a silyloxy group having from 3 to 20 carbon atoms, e.g., trimethylsilyloxy, tert-butyidimethylsilyloxy), a heterocyclic oxy group (preferably a substituted or unsubstituted heterocyclic oxy group having 2 to 30 carbon atoms, in which the heterocyclic moiety is preferably the same as that of the above-described heterocyclic group, e.g., 1-phenyltetrazole-5-oxy, 2-tetrahydropyranyloxy), an acyloxy group (preferably a formyloxy group, a substituted or unsubstituted alkylcarbonyloxy group having from 2 to 30 carbon atoms, or a substituted or unsubstituted arylcarbonyloxy group having from 6 to 30 carbon atoms, e.g., formyloxy, acetyloxy, pivaloyloxy, stearoyloxy, benzoyloxy, p-methoxyphenylcarbonyloxy), a carbamoyloxy group (preferably a substituted or unsubstituted carbamoyloxy group having from 1 to 30 carbon atoms, e.g., N,N-dimethylcarbamoyloxy, N,N-diethylcarbamoyloxy, morpholinocarbonyloxy, N,N-di-n-octylaminocarbonyloxy, N-n-octylcarbamoyloxy), an alkoxycarbonyloxy group (preferably a substituted or unsubstituted alkoxycarbonyloxy group having from 2 to 30 carbon atoms, e.g., methoxycarbonyloxy, ethoxycarbonyloxy, tert-butoxycarbonyloxy, n-octylcarbonyloxy), an aryloxycarbonyloxy group (preferably a substituted or unsubstituted aryloxycarbonyloxy group having from 7 to 30 carbon atoms, e.g., phenoxycarbonyloxy, p-methoxyphenoxycarbonyloxy, p-n-hexadecyloxyphenoxycarbonyloxy), an amino group (preferably an unsubstituted amino group, a substituted or unsubstituted alkylamino group having 1 to 30 carbon atoms, a substituted or unsubstituted arylamino group having 6 to 30 carbon atoms, and a heterocyclic amino group having 0 (zero) to 30 carbon atoms, e.g., amino, methylamino, dimethylamino, anilino, N-methyl-anilino, diphenylamino, N-1,3,5-triazine-2-il amino), an acylamino group (preferably a formylamino group, a substituted or unsubstituted alkylcarbonylamino group having 1 to 30 carbon atoms, and a substituted or unsubstituted arylcarbonylamino group having 6 to 30 carbon atoms, e.g., formylamino, acetylamino, pivaloylamino, lauroylamino, benzoylamino, and 3,4,5-tri-n-octyloxyphenylcarbonylamino), an aminocarbonylamino group (preferably a substituted or unsubstituted aminocarbonylamino group having 1 to 30 carbon atoms, e.g., carbamoylamino, N,N-dimethylaminocarbonylamino, N,N-diethylaminocarbonylamino, morpholinocarbonylamino), an alkoxycarbonylamino group (preferably a substituted or unsubstituted alkoxycarbonylamino group having 2 to 30 carbon atoms, e.g., methoxycarbonylamino, ethoxycarbonylamino, t-butoxycarbonylamino, n-octadecyloxycarbonylamino, N-methyl-methoxycarbonylamino), an aryloxycarbonylamino group (preferably a substituted or unsubstituted aryloxycarbonylamino group having 7 to 30 carbon atoms, e.g., phenoxycarbonylamino, p-chlorophenoxycarbonylamino, m-n-octyloxyphenoxycarbonyl amino), a sulfamoylamino group (preferably a substituted or unsubstituted sulfamoylamino group having 0 (zero) to 30 carbon atoms, e.g., sulfamoylamino, N,N-dimethylaminosulfonylamino, N-n-octylaminosulfonylamino), an alkyl- or aryl-sulfonylamino group (preferably a substituted or unsubstituted alkylsulfonylamino group having 1 to 30 carbon atoms and a substituted or unsubstituted arylsulfonylamino group having 6 to 30 carbon atoms, e.g., methylsulfonylamino, butylsulfonylamino, phenylsulfonylamino, 2,3,5-trichlorophenylsulfonylamino, p-methylphenylsulfonylamino), a mercapto group, an alkylthio group (preferably a substituted or unsubstituted alkylthio group having 1 to 30 carbon atoms, e.g., methylthio, ethylthio, n-hexadecylthio), an arylthio group (preferably a substituted or unsubstituted arylthio group having 6 to 30 carbon atoms, e.g., phenylthio, p-chlorophenylthio, m-methoxyphenylthio), a heterocyclic thio group (preferably a substituted or unsubstituted heterocyclic thio group having 2 to 30 carbon atoms, in which the heterocyclic moiety is preferably the same as that of the above-described heterocyclic group, e.g., 2-benzothiazolylthio, 1-phenyltetrazol-5-ylthio), a sulfamoyl group (preferably a substituted or unsubstituted sulfamoyl group having 0 (zero) to 30 carbon atoms, e.g., N-ethylsulfamoyl, N-(3-dodecyloxypropyl)sulfamoyl, N,N-dimethylsulfamoyl, N-acetylsulfamoyl, N-benzoylsulfamoyl, N-(N'-phenylcarbamoyl)sulfamoyl), a sulfo group, an alkyl- or aryl-sulfinyl group (preferably a substituted or unsubstituted alkylsulfinyl group having 1 to 30 carbon atoms, and a substituted or unsubstituted arylsulfinyl group having 6 to 30 carbon atoms, e.g., methylsulfinyl, ethylsulfinyl, phenylsulfinyl, p-methylphenylsulfinyl), an alkyl- or aryl-sulfonyl group (preferably a substituted or unsubstituted alkylsulfonyl group having 1 to 30 carbon atoms, and a substituted or unsubstituted arylsulfonyl group having 6 to 30 carbon atoms, e.g., methylsulfonyl, ethylsulfonyl, phenylsulfonyl, p-methylphenylsulfonyl), an acyl group (preferably a formyl group, a substituted or unsubstituted alkylcarbonyl group having 2 to 30 carbon atoms, and a substituted or unsubstituted arylcarbonyl group having 7 to 30 carbon atoms, e.g., acetyl, pivaloyl, 2-chloroacetyl, stearoyl, benzoyl, p-n-octyloxyphenylcarbonyl), an aryloxycarbonyl group (preferably a substituted or unsubstituted aryloxycarbonyl group having 7 to 30 carbon atoms, e.g., phenoxycarbonyl, o-chlorophenoxycarbonyl, m-nitrophenoxycarbonyl, p-t-butylphenoxycarbonyl), an alkoxycarbonyl group (preferably a substituted or unsubstituted alkoxycarbonyl group having 2 to 30 carbon atoms, e.g., methoxycarbonyl, ethoxycarbonyl, t-butoxycarbonyl, n-octadecyloxycarbonyl), a carbamoyl group (preferably a substituted or unsubstituted carbamoyl group having 1 to 30 carbon atoms, e.g., carbamoyl, N-methylcarbamoyl, N,N-dimethylcarbamoyl, N,N-di-n-octylcarbamoyl, N-(methylsulfonyl)carbamoyl), an aryl- or heterocyclic-azo group (preferably a substituted or unsubstituted aryl azo group having 6 to 30 carbon atoms, and a substituted or unsubstituted heterocyclic azo group having 3 to 30 carbon atoms, in which the heterocyclic moiety is preferably the same as that of the above-described heterocyclic group, e.g., phenylazo, p-chlorophenylazo, 5-ethylthio-1,3,4-thiadiazole-2-yl azo), an imido group (preferably a substituted or unsubstituted imido group having 2 to 30 carbon atoms, e.g., N-succinimido, N-phthalimido), a phosphino group (preferably a substituted or unsubstituted phosphino group having 2 to 30 carbon atoms, e.g., dimethylphosphino, diphenylphosphino, methylphenoxyphosphino), a phosphinyl group (preferably a substituted or unsubstituted phosphinyl group having 2 to 30 carbon atoms, e.g., phosphinyl, dioctyloxyphosphinyl, diethoxyphosphinyl), a phosphinyloxy group (preferably a substituted or unsubstituted phosphinyloxy group having 2 to 30 carbon atoms, e.g., diphenoxyphosphinyloxy, dioctyloxyphosphinyloxy), a phosphinylamino group (preferably a substituted or unsubstituted phosphinylamino group having 2 to 30 carbon atoms, e.g., dimethoxyphosphinylamino, dimethylaminophosphinylamino), and a silyl group (preferably a substituted or unsubstituted silyl group having 3 to 30 carbon atoms, e.g., trimethylsilyl, t-butyldimethylsilyl, phenyldimethylsilyl).

Among the substituents, with respect to one having a hydrogen atom, the hydrogen atom may be removed and be substituted by any of the above-mentioned substituents. Examples thereof include: an alkylcarbonylaminosulfonyl group, an arylcarbonylaminosulfonyl group, an alkylsulfonylaminocarbonyl group, and an arylsulfonylaminocarbonyl group. Specific examples thereof include methylsulfonylaminocarbonyl, p-methylphenylsulfonylaminocarbonyl, acetylaminosulfonyl, and benzoylaminosulfonyl.

The cycloalkyl group represented by $R^1$ and $R^2$ includes a cycloalkyl group having a substituent, or an unsubstituted cycloalkyl group. These cycloalkyl groups are preferably those having 3 to 30 carbon atoms excluding carbon atoms of the substituent(s). Specific examples of the cycloalkyl group include cyclopentyl, cyclohexyl, cycloheptyl, and cyclooctyl groups. Examples of the substituent that the cycloalkyl group may have thereon, include those exemplified as a substituent for the alkyl group.

The alkenyl group represented by $R^1$ and $R^2$ includes an alkenyl group having a substituent, or an unsubstituted alkenyl group. These alkenyl groups are preferably those having 2 to 30 carbon atoms excluding carbon atoms of the substituent(s). Specific examples of the alkenyl group include allyl, prenyl, geranyl and oleyl groups. Examples of the substituent that the alkenyl group may have thereon, include those exemplified as a substituent for the alkyl group.

The alkynyl group represented by $R^1$ and $R^2$ includes an alkynyl group having a substituent, or an unsubstituted alkynyl group. These alkynyl groups are preferably those having 2 to 30 carbon atoms excluding carbon atoms of the substituent(s). Specific examples of the alkynyl group include ethynyl and propargyl groups. Examples of the substituent that the alkynyl group may have thereon, include those exemplified as a substituent for the alkyl group.

The aryl group represented by $R^1$ and $R^2$ includes an aryl group having a substituent, or an unsubstituted aryl group. These aryl groups are preferably those having 6 to 30 carbon atoms excluding carbon atoms of the substituent(s). Specific examples of the aryl group include phenyl, p-tolyl and naphthyl groups. Examples of the substituent that the aryl group may have thereon, include those exemplified as a substituent for the alkyl group.

The alkoxycarbonyl group represented by $R^1$ and $R^2$ includes an alkoxycarbonyl group having a substituent, or an unsubstituted alkoxycarbonyl group. These alkoxycarbonyl groups are preferably those having 2 to 30 carbon atoms excluding carbon atoms of the substituent(s). Specific examples of the alkoxycarbonyl group include methoxycarbonyl, ethoxycarbonyl, t-butoxycarbonyl and n-octadecyloxycarbonyl groups. Examples of the substituent that the alkoxycarbonyl group may have thereon, include those exemplified as a substituent for the alkyl group.

Of the above-described $R^1$ and $R^2$, preferred are a hydrogen atom; a straight or branched alkyl group having 1 to 5 carbon atoms excluding carbon atoms of a substituent, if any; a cycloalkyl group having 3 to 8 carbon atoms excluding carbon atoms of a substituent, if any; an alkenyl group having 2 to 5 carbon atoms excluding carbon atoms of a substituent, if any; and an alkoxycarbonyl group having 2 to 5 carbon atoms excluding carbon atoms of a substituent, if any. Most preferred are a hydrogen atom, an alkyl group having 1 to 5 carbon atoms excluding carbon atoms of a substituent, if any, and a cycloalkyl group having 3 to 8 carbon atoms excluding carbon atoms of a substituent, if any.

$X^1$ represents a hydrogen atom, or a halogen atom (fluorine, chlorine, bromine, iodine). Of these atoms, preferred are hydrogen, fluorine and chlorine atoms. Most preferred is a hydrogen atom.

Y represents an alkoxycarbonyl group or —$CH_2OCOR^3$. Examples of the alkoxycarbonyl group for Y include those exemplified for the above-described $R^1$ and $R^2$, and the preferable range is also the same. In —$CH_2OCOR^3$, $R^3$ represents an alkyl group, a cycloalkyl group, or an aryl group. Examples of the alkyl, cycloalkyl and aryl groups for $R^3$ include those exemplified for the above-described $R^1$ and $R^2$, and the preferable range is also same.

In formula (II), $R^{1F}$ and $R^{2F}$ each independently represent a halogen atom (fluorine, chlorine, bromine or iodine), a fluorine-containing alkyl group, a fluorine-containing cycloalkyl group, or a fluorine-containing alkoxy group. $R^{1F}$ and $R^{2F}$ are the same or different, and may be bonded together to form a ring. The fluorine-containing alkyl group, the fluorine-containing cycloalkyl group, and the fluorine-containing alkoxy group for $R^{1F}$ and $R^{2F}$ each are a group having a structure in which at least one of a hydrogen atom, an unsaturated bond and other reaction points of the alkyl group, the cycloalkyl group, the alkenyl group, the alkynyl group, the aryl group, or the alkoxycarbonyl group in $R^1$ and $R^2$ is substituted with a fluorine atom. Of the $R^{1F}$ and $R^{2F}$, preferred are a fluorine atom, a straight or branched fluorine-containing alkyl group, a fluorine-containing cycloalkyl group having 3 to 8 carbon atoms excluding carbon atoms of a substituent, if any, a fluorine-containing alkoxy group having 1 to 5 carbon atoms excluding carbon atoms of a substituent, if any. Most preferred are a fluorine atom, a fluorine-containing alkyl group having 1 to 5 carbon atoms excluding carbon atoms of a substituent, if any, and a fluorine-containing cycloalkyl group having 3 to 8 carbon atoms excluding carbon atoms of a substituent, if any, $X^{1F}$ represents a halogen atom (fluorine, chlorine, bromine, iodine). Of these atoms, preferred are fluorine and chlorine atoms. Most preferred is a fluorine atom.

$Y^F$ represents a fluorine-containing alkoxycarbonyl group, or —$CF_2OCOR^{3F}$. Examples of the fluorine-containing alkoxycarbonyl group for $Y^F$ include those exemplified for the above-described $R^1$ and $R^2$, and the preferable range is also same. For $Y^F$, $R^{3F}$ in the —$CF_2OCOR^{3F}$ group represents a fluorine-containing alkyl group, or a fluorine-containing cycloalkyl group. Examples of the fluorine-containing alkyl group and the fluorine-containing cycloalkyl group for $R^{3F}$ include those exemplified for the above-described $R^1$ and $R^2$, and the preferable range is also the same. When $X^1$, Y, $R^1$ and $R^2$ in formula (I) do not change before and after the <Step 1>, $X^{1F}$, $Y^F$, $R^{1F}$ and $R^{2F}$ have the same meanings as $X^1$, Y, $R^1$ and $R^2$ in formula (I), respectively.

In formula (III-A), $X^{1F}$, $R^{1F}$ and $R^{2F}$ have the same meanings as those in formula (II), respectively, and the preferable ranges thereof are also the same. $X^{2F}$ represents a halogen atom (fluorine, chlorine, bromine, iodine). Of these halogen atoms, preferred are fluorine and chlorine atoms. Most preferred is a fluorine atom.

In formula (III-B), $X^{1F}$, $R^{1F}$ and $R^{2F}$ have the same meanings as those in formula (II), and the preferable ranges of these groups are also the same as those in formula (II). M represents a metal compound. The metal compound includes metals and metal complexes. Examples of the metal contained in the metal compound include alkali metals (Li, Na, K, Rb, Cs and Fr), alkali earth metals (Be, Mg, Ca, Sr, Ba and Ra), Cu, Ag, Au, Al and Ti. When a valence number of the metal atom is bivalence or more, it is preferable that the metal atom is in a form of a complex with a ligand. In the case of Mg as an example, it is preferable that Mg acting as a central metal is coordinated by two carboxyl groups in formula (III-B) acting as a chelate, or alternatively Mg has another atom as exemplified by MgBr.

In formula (IV) and (IVa), $R^{1F}$ and $R^{2F}$ have the same meanings as those in formula (II), and the preferable ranges of these groups are also the same as those in formula (II).

Next, specific examples of the compound represented by formula (I) will be shown below, but the present invention is not limited to those.

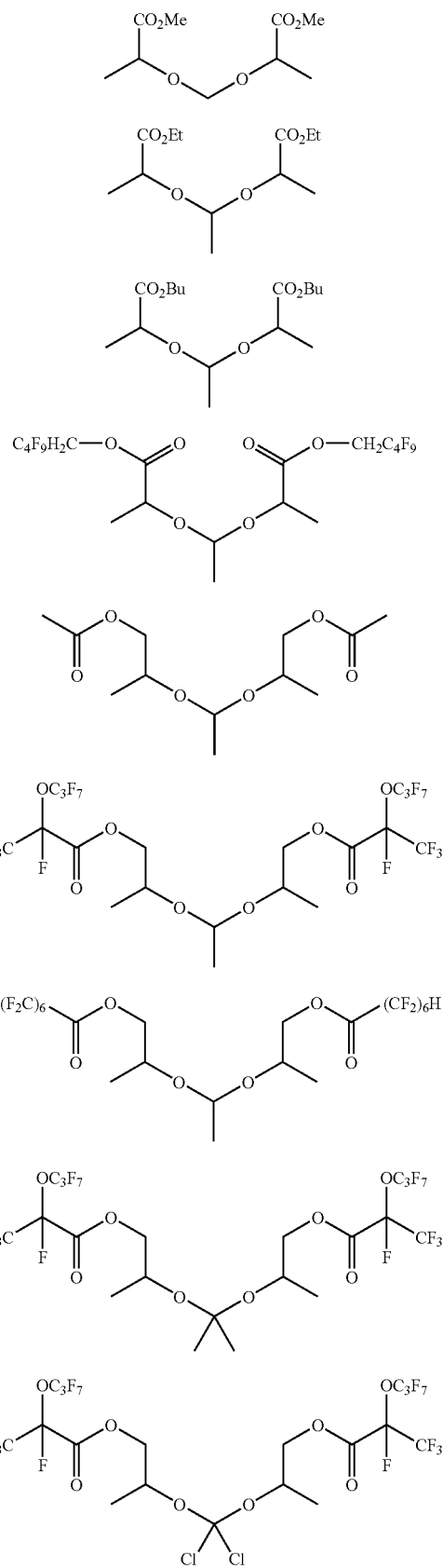
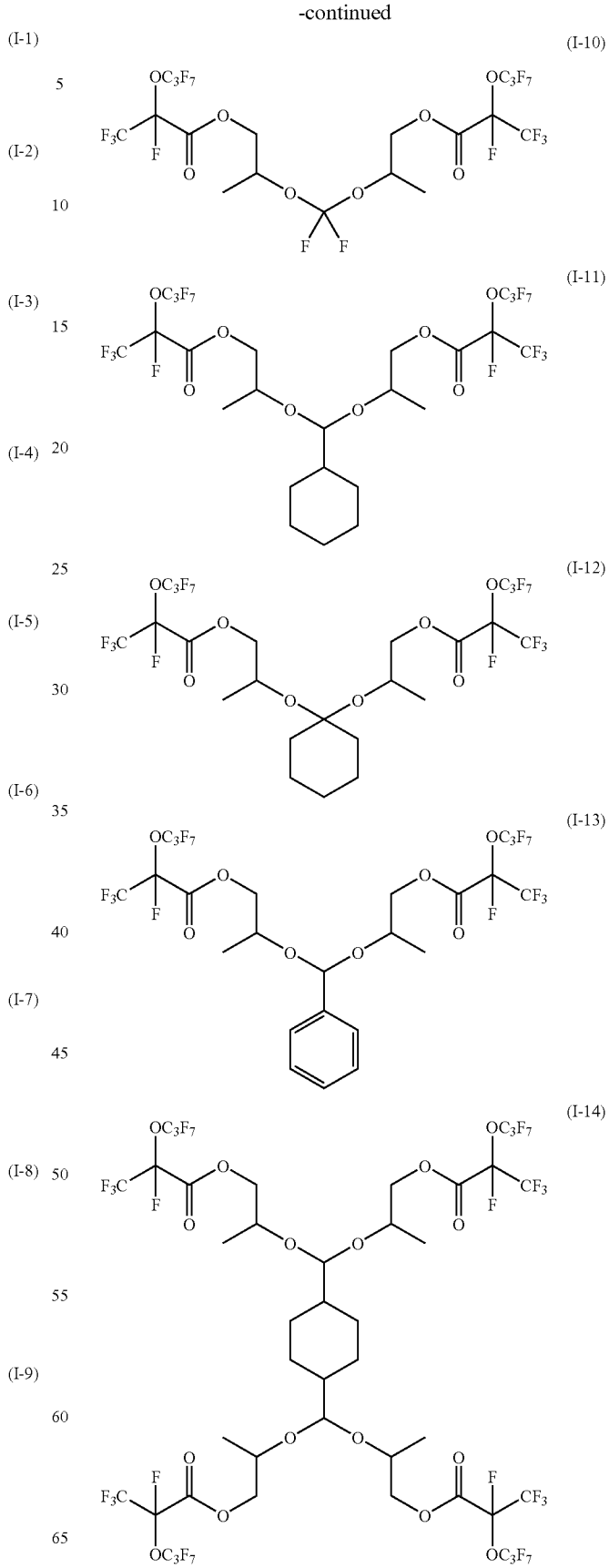

-continued
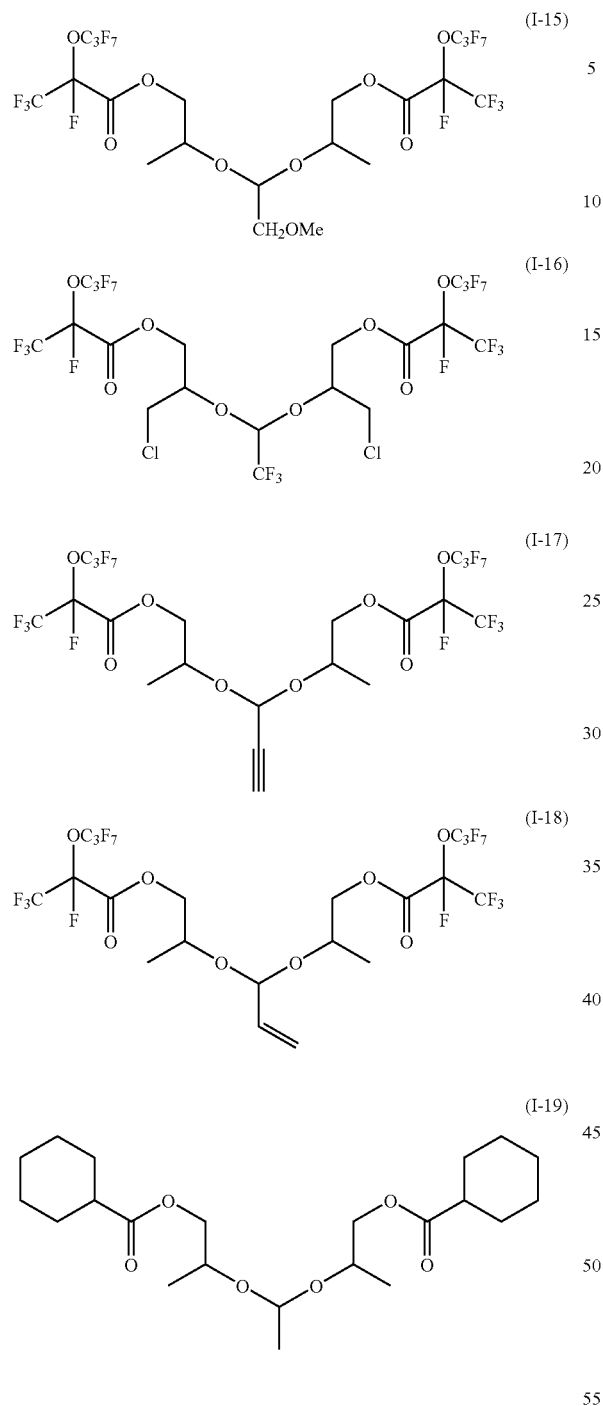
Next, specific examples of the compound represented by formula (II) will be shown below, but the present invention is not limited to those.
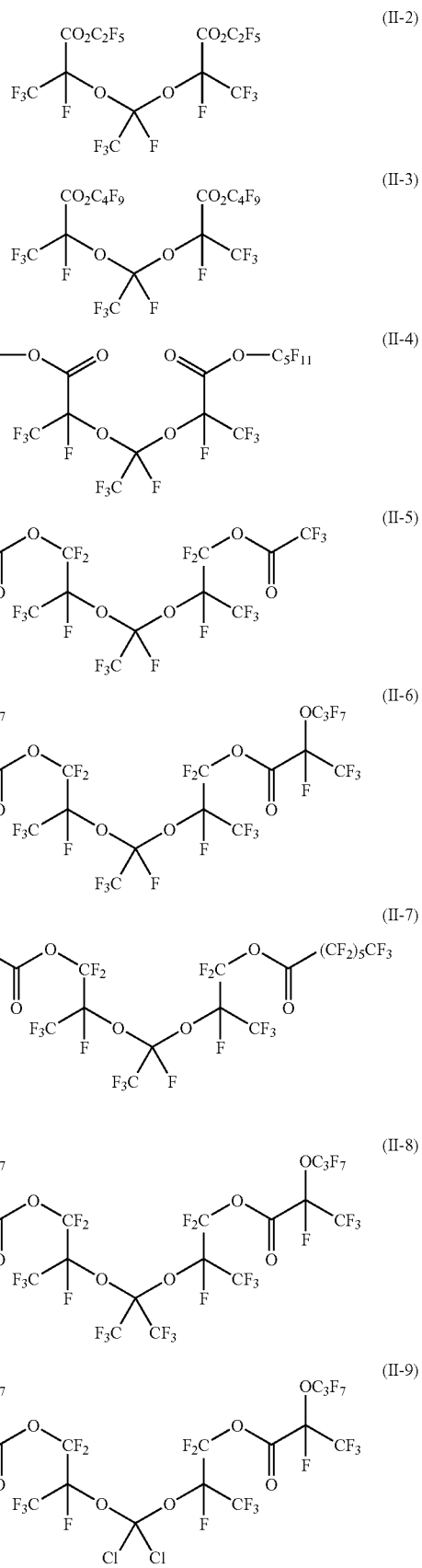

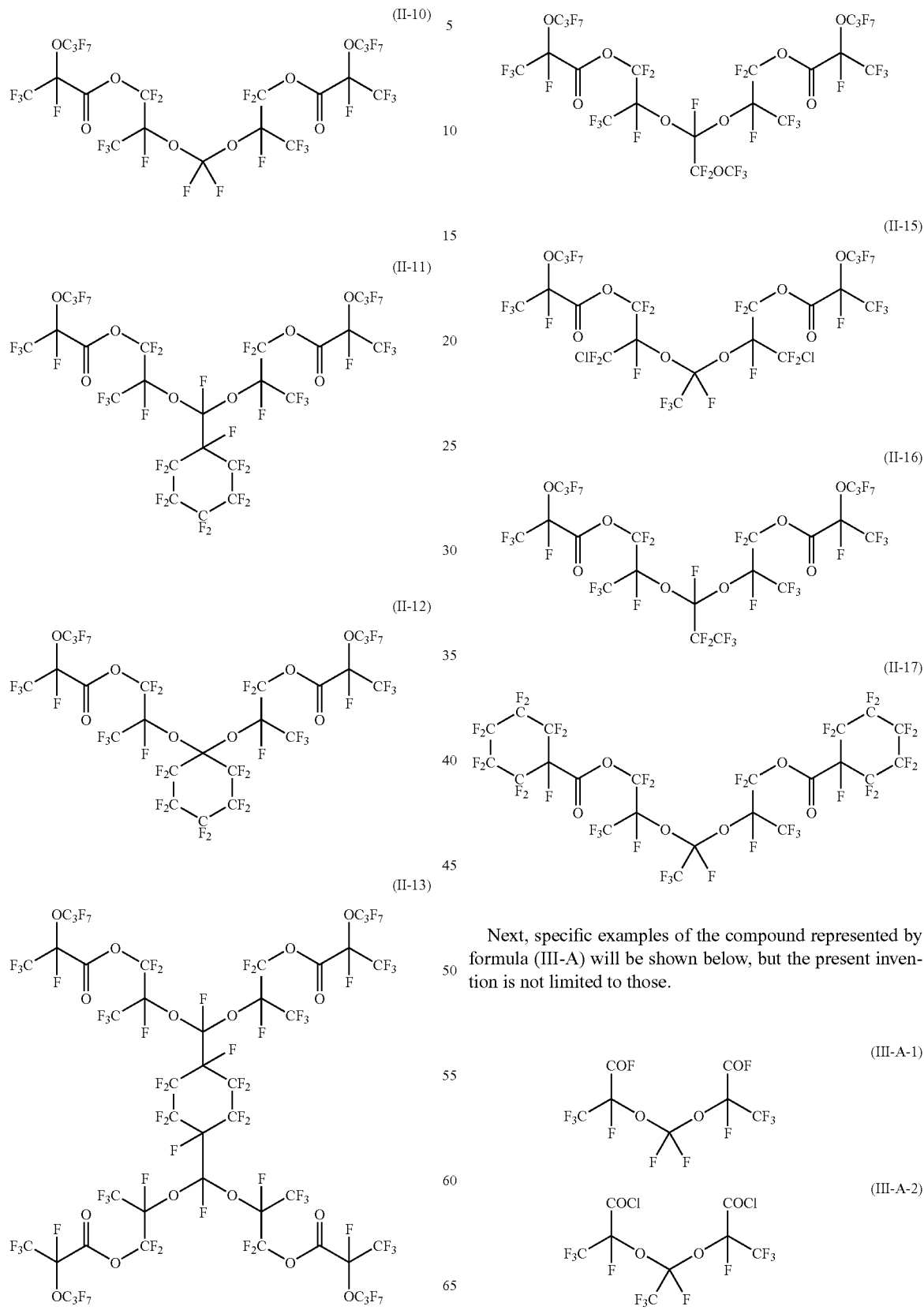
Next, specific examples of the compound represented by formula (III-A) will be shown below, but the present invention is not limited to those.
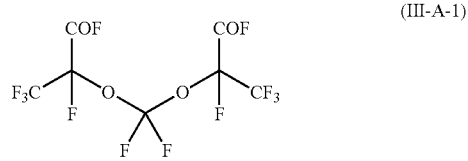
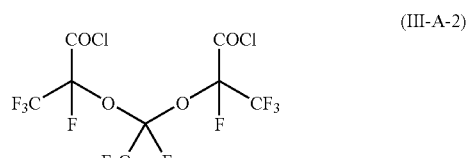

-continued
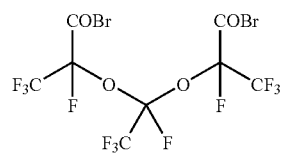
(III-A-3)
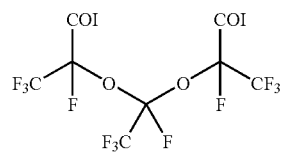
(III-A-4)
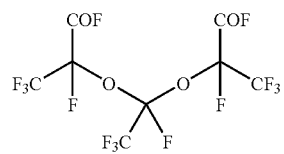
(III-A-5)
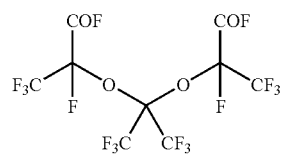
(III-A-6)
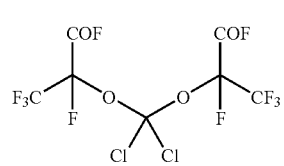
(III-A-7)
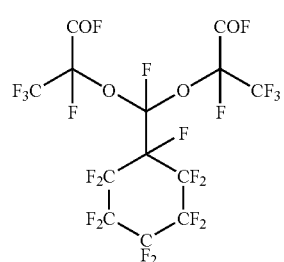
(III-A-8)
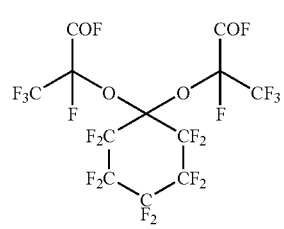
(III-A-9)
-continued
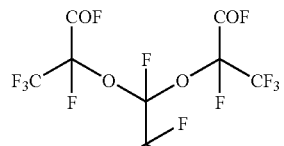
(III-A-10)
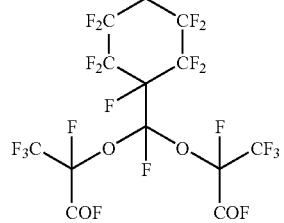
(III-A-11)
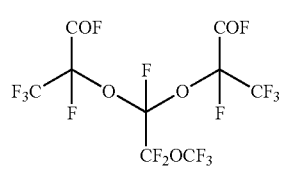
(III-A-12)
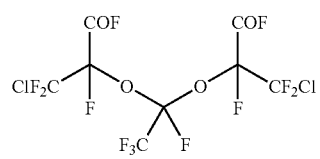
(III-A-13)
Next, specific examples of the compound represented by formula (III-B) will be shown below, but the present invention is not limited to those.
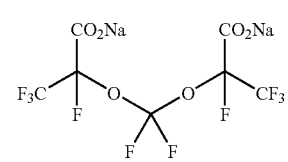
(III-B-1)
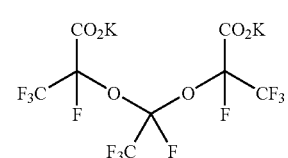
(III-B-2)
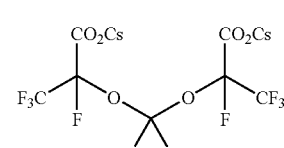
(III-B-3)

-continued
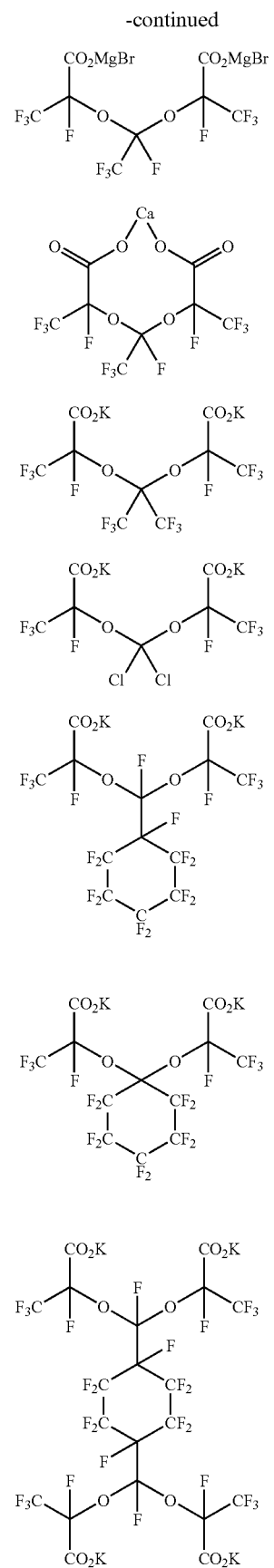
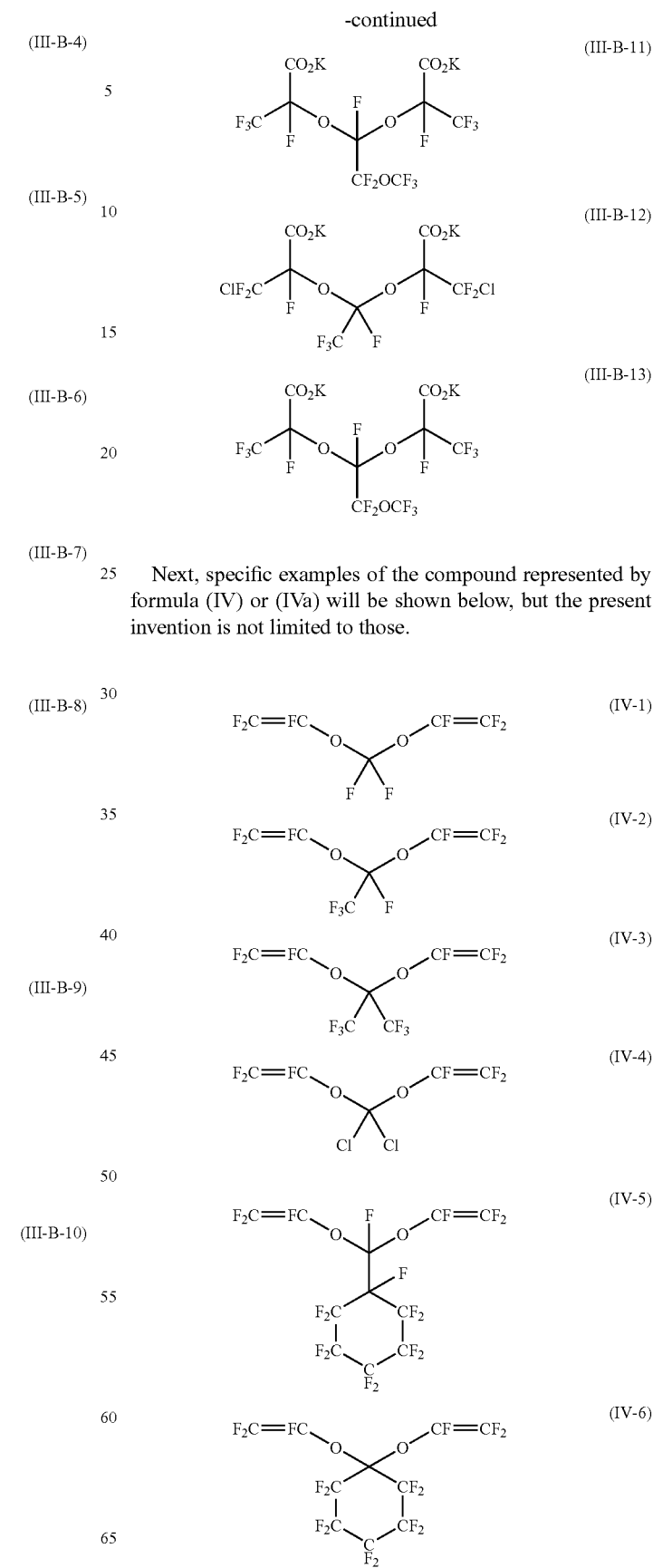
Next, specific examples of the compound represented by formula (IV) or (IVa) will be shown below, but the present invention is not limited to those.

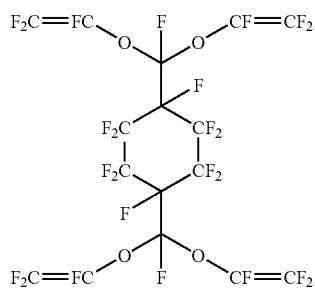 (IV-7)

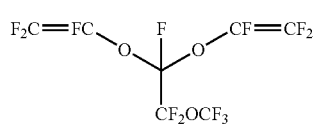 (IV-8)

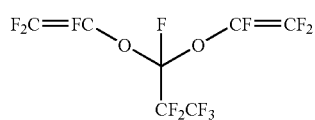 (IV-9)

Next, description will be made in detail on synthetic methods of the above-described compounds represented by formula (I), (II), (III-A), (III-B), (IV), or (IVa).

The above-described compounds represented by formula (I) can be synthesized by treating a compound represented by formula (V) set forth below, according to the following (Method 1-1) and optionally (Method 1-2).

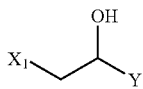 Formula (V)

In formula (V), $X_1$ and Y have the same meanings as those in formula (I), respectively, and the preferable ranges thereof are also the same.

(Method 1-1) A method of making acetalization of the compound represented by formula (V) (for example, lactic acid esters, and 1-carboxy-2-propanol).

(Method 1-2) A method of making acetalization of the compound represented by formula (V) (for example, lactic acid esters), followed by reduction and esterification.

According to the (Method 1-1), the compound represented by formula (I) can be obtained from a compound represented by formula (V). Further, according to the (Method 1-2), the compound represented by formula (I) in which Y is —CH$_2$OCOR (R represents an alkyl group, a cycloalkyl group, or an aryl group) can be obtained from a compound represented by formula (I) in which Y is an alkoxycarbonyl group.

The acetalization in the (Method 1-1) and (Method 1-2) above is described in the below. To carry out acetalization, use may be made of any method, for example, a method of utilizing reaction of an alcohol with a carbonyl compound or its equivalent, in the presence of an acid, and a method of reacting an alcohol with thiophosgene, and then with chlorine, and then if necessary, with antimony fluoride. Of these methods, preferred is the method of utilizing reaction of an alcohol with a carbonyl compound or its equivalent in the presence of an acid. Especially, it is most preferable that the carbonyl compound or its equivalent is an acetal compound. As for the acid, use may be made of any acid, such as sulfuric acid, methanesulfonic acid, p-toluenesulfonic acid, trifluoromethanesulfonic acid, p-toluenesulfonic acid pyridinium salt, and Nafion (trade name). Preferred are sulfuric acid, p-toluenesulfonic acid, and p-toluenesulfonic acid pyridinium salt. Most preferred is p-toluenesulfonic acid pyridinium salt. As to the p-toluenesulfonic acid pyridinium salt, p-toluenesulfonic acid and pyridine may be mixed in a reaction system to generate the pyridinium salt for use, in situ. It is preferable to conduct the reaction while eliminating alcohol generating as a byproduct. As the elimination method of alcohol, examples of the method include a distillation method using a Dean-Stark tube, an elimination method using an adsorbing agent such as a molecular sieve, and an elimination method using a separation film. Of these methods, preferred is the distillation method using a Dean-Stark tube. Examples of a solvent that can be used in these methods include sulfoxides (e.g., dimethylsulfoxide), esters (e.g., ethyl acetate, butyl acetate, ethyl propionate), ethers (e.g., diethyl ether, dibutyl ether, tetrahydrofuran), aliphatic hydrocarbons (e.g., pentane, hexane), aromatic hydrocarbons (e.g., toluene, xylene,

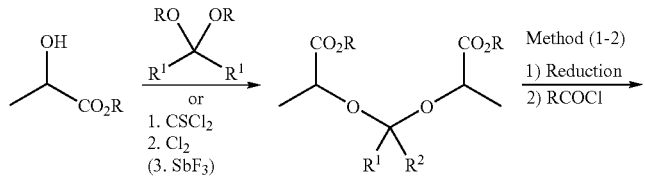

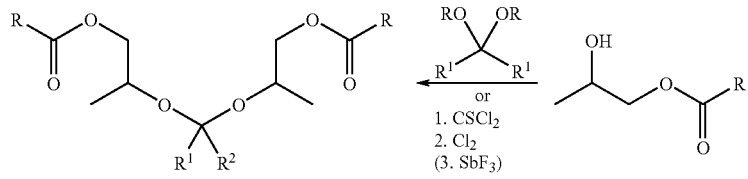

mesitylene), nitriles (e.g., acetonitrile, propionenitrile), amides (e.g., N,N-dimethylformamide, N,N-dimethylacetoamide, N-methylpyrrolidone) and halogen-containing solvents (e.g., chloroform, 1,2-dichloroethane). Of these solvents, preferred are esters, ethers, aromatic hydrocarbons and aliphatic hydrocarbons. Most preferred are toluene, xylene, mesitylene, hexane and heptane. The amount of the solvent to be used is not limited in particular, but it is preferable to use the solvent in an amount of from 0.01 to 100 times by volume, more preferably from 0.1 to 50 times by volume, based on the compound represented by formula (V).

A reaction temperature is preferably at least a boiling point of the solvent or alcohol generating as a byproduct, more preferably in the range of from [a boiling point of the solvent] to [a boiling point of the solvent +20° C.]. The completion of a reaction can be checked by NMR, GLC, HPLC, TLC, GC-MASS or other methods. A time period to be required for the reaction is not univocally determined because of affection owing to various reaction conditions, but the time is generally in the range of about 1 to 24 hours.

After termination of the reaction, it is preferable that water or a sodium bicarbonate aqueous solution is added to the reaction solution, and then the reaction solution is washed by an extracting operation. An organic solvent that can be used for the extracting operation is not particularly limited so long as the organic solvent is able to extract a product from the reaction solution. Preferable solvents are alkane-series solvents (e.g., hexane, heptane, octane, nonane), aryl-series solvents (e.g., toluene, xylene, mesitylene, ) and ester-series solvents (e.g., ethyl acetate, butyl acetate), and especially preferable solvents are hexane, toluene, xylene and ethyl acetate. An amount of the organic solvent to be used in the extracting operation is preferably in the range of from 0.01 to 100 times by volume, more preferably from 0.1 to 50 times by volume, based on the produced compound represented by formula (I) thus formed.

Next, reduction in the (Method 1-2) is described in detail. A reducing method is not limited in particular, so long as the method is able to reduce an ester moiety, but a method of employing $LiAlH_4$ is especially preferable. When $LiAlH_4$ is employed, the $LiAlH_4$ is preferably used in the amount of from 1.0 to 4.0 molar equivalents, most preferably from 1.0 to 2.0 molar equivalents, based on the compound represented by formula (I) in which Y is an alkoxycarbonyl group. A reaction temperature is preferably in the range of from −20° C. to 50° C., and most preferably from −10° C. to 35° C. Preferable reaction solvents are dehydrated ether-series solvents (e.g., diethyl ether, dibutyl ether, tetrahydrofuran). Most preferable reaction solvents are diethyl ether and tetrahydrofuran. A reaction is preferably carried out by the steps of: preliminarily diluting with a solvent a compound represented by formula (I) in which Y is an alkoxycarbonyl group, and then adding the thus-diluted compound, dropwise, into a mixed solution of tetrahydrofuran and $LiAlH_4$, under an inactive gas atmosphere. Examples of the inactive gas include nitrogen, argon and helium. Among these gases, nitrogen is most preferable from an economical viewpoint.

Next, esterification in the (Method 1-2) is described in detail. For the esterification, an arbitrary method may be used. Examples of the method include a method of using an acid halide, a method of using a transesterification with an ester, and a method of using a carboxylic acid and a condensation agent. Among these methods, a method of using an acid halide is especially preferable because of convenience. An amount of the acid halide to be used is preferably in the range of from 2.0 to 5.0 mole equivalents, and most preferably from 2.0 to 3.0 mole equivalents, based on the compound represented by formula (I) in which Y is an alkoxycarbonyl group. A reaction is preferably performed in the presence of a base. Examples of the base include pyridine-series compounds (e.g., pyridine, α-picoline, γ-picoline, 2,3-lutidine, 2,4-lutidine, 4-N,N-dimethylaminopyridine), amine-series compounds (e.g., triethylamine, tributylamine, isopropyldiethylamine), carbonates (e.g., sodium bicarbonate, sodium carbonate, potassium bicarbonate, potassium carbonate). Of these compounds, preferred are pyridine-series compounds and amine-series compounds. Most preferred are pyridine and triethylamine. These bases may be used singly, or as a mixture thereof. An amount of the base to be uses is preferably in the range of from 2.0 to 5.0 mole equivalents, and most preferably from 2.0 to 3.0 mole equivalents, based on the compound represented by formula (I) in which Y is an alkoxycarbonyl group. A reaction temperature is preferably in the range of from −20° C. to 50° C., and most preferably from −10° C. to 35° C. The completion of the reaction can be checked by NMR, GLC, HPLC, TLC, GC-MASS or other methods. A period of time to be required for the reaction is not univocally determined because of affection owing to various reaction conditions, but the time is generally in the range of from about 1 to 24 hours.

Next, a synthetic method of a compound represented by formula (II) is described in detail. The compound represented by formula (II) can be synthesized via the above-described <Step 1> (fluorination of a compound represented by formula (I)). A fluorinating agent may be arbitrarily used without any particular limitation, so long as the compound is able to react with a carbon-hydrogen bond, and to convert the carbon-hydrogen bond into a carbon-fluorine bond. Examples of the fluorinating agent include a fluorine gas, $XeF_2$ and $CoF_3$. Of these compounds, the fluorine gas is especially preferred from an economical viewpoint. As a method of fluorination, there is no particular limitation. Among the methods, the following two methods can be carried out.

(Method 2-1) A method of adding a fluorinating agent to a system containing a substrate.

(Method 2-2) A method of simultaneously adding a system containing a substrate and a fluorinating agent to a solvent, to proceed the reaction.

Of these methods, the (Method 2-2) is most preferred from the viewpoints of yield and efficiency. The amount of the fluorinating agent to be used is preferably in the range of from 1.0 to 5.0 mole equivalents, and most preferably from 1.0 to 2.0 mole equivalents, based on the reaction sites on the substrate. A reaction temperature of fluorination is preferably in the range of from −50° C. to 100° C., and most preferably from −10° C. to 50° C.

The solvent that can be used in the present invention is preferably a solvent that does not cause any depletion of the ozone layer, and that substantially does not react with fluorine. Examples of the solvent include perfluoro alkanes (which may be a mixture composed of structural isomers, e.g. perfluoropentane, perfluorohexane, perfluoroheptane, and perfluorooctane), perfluoro cycloalkanes (which may be a mixture composed of structural isomers, e.g. perfluorocyclopentane, perfluorocyclohexane, perfluorocycloheptane, and perfluorocyclooctane), perfluoro ethers (which may be a mixture composed of structural isomers, e.g. Fluorinert™ FC-75 (trade name, manufactured by 3M Co.), and Krytox™ (trade name, manufactured by Du Pont Co.)), perfluoro alkylamines (which may be a mixture composed of structural isomers, e.g. perfluorotributylamine), perfluoro acid fluorides (which may be a mixture composed of structural isomers, e.g. perfluoro (2-methyl-3-oxahexanoyl)fluoride, perfluoro(2,5,8-trimethyl-3,6,9-trioxadodecanoyl)fluoride), hydrogen fluoride, water, trifluoroacetic acid, supercritical carbon dioxide, and acetonitrile. Of the above-mentioned solvents, use can be made, in some cases, of solvents partially having sites where the solvents can react with fluorine; and examples thereof include those in which fluorine atoms are partially substituted by hydrogen atoms (e.g. 6H-tridecafluorohexane, 2,2-bis(trifluoromethyl)propionyl fluoride), and those in which fluorine atoms are partially substituted by halogen atoms (e.g. perfluorooctyl iodide, perfluorohexyl bromide). These solvents may be used singly, or in combination of two or more of these. Of the above-mentioned solvents, a perfluoro alkane, a perfluoro cycloalkane, a perfluoro ether, a perfluoro alkylamine, and a perfluoro acid fluoride are most preferred. The amount of the solvent to be used is preferably 0.1 to 500 times, more preferably 1 to 300 times, and further preferably 3 to 200 times, as large as the volume of the substrate to be injected.

When it is difficult to proceed the fluorination reaction, the fluorination reaction can be accelerated by carrying out the reaction, in the presence of a substrate that rapidly undergoes fluorination reaction independently. Herein, the "substrate that rapidly undergoes fluorination reaction independently" means a compound having a plurality of site(s) at which reaction with fluorine can proceed easily. Examples thereof include a linear, branched or cyclic hydrocarbon compound having 5 to 30 carbon atoms, which may contain a fluorine atom, an oxygen atom, or/and an unsaturated bond, provided that the hydrocarbon compound has at least one unsaturated bond or at least one C—H bond in the molecule. Specific examples thereof include pentane, hexane, hexene, cyclohexane, cyclohexene, diethyl ether, tetrahydrofuran, ethyl acetate, hexafluoroisopropyl methyl ether, 1,1,2,3,3,3-hexafluoropropyl ethyl ether, benzene, toluene, fluorobenzene, trifluoromethylbenzene, 4-fluorotrimethylbenzene, and hexafluorobenzene. The above compounds, which may be soluble or insoluble in a solvent to be used, can be used in the present invention, without particular limitation, as long as they can accelerate the reaction, but it is preferable that the compound is soluble in the solvent. The substrate that rapidly undergoes fluorination reaction independently can be incorporated into the system, by adding the same to a fluorine-containing polymer in a solid or molten state, or by adding to a solution of a fluorine-containing polymer.

In the present invention, the fluorine gas may be used, as it is, without being diluted. For safety, the fluorine gas is preferably used in the state of mixed gas with an inert gas. The inert gas is preferably nitrogen gas or helium gas. From the viewpoint of economy, nitrogen gas is preferred. The concentration of the fluorine gas in the inert gas is preferably from 10 to 50% by volume, more preferably from 20 to 30% by volume.

After termination of the reaction, if a progress of the fluorination is not complete, it is possible to finish the reaction, by simultaneously adding, to the reaction system, a fluorinating agent and the above-described substrate that rapidly undergoes fluorination reaction independently. The amount to be used of the substrate that rapidly undergoes fluorination reaction independently is not univocally determined, since the amount depends on reactivity of the reaction substrate. Generally, the substrate that rapidly undergoes fluorination reaction independently is preferably used so that a reaction point of said substrate becomes an amount in the range of from 0.010 to 1.0 mole equivalent, and most preferably from 0.10 to 0.50 mole equivalent, based on the reaction point of the reaction substrate. As a method of introducing the substrate that rapidly undergoes fluorination reaction independently, the substrate may be introduced as a solution or dispersion in a solvent, or alternatively it may be introduced as a neat thereof.

Next, the synthetic method of the compound represented by formula (III-A) or (III-B) is described in detail.

The compounds represented by formula (III-A) or (III-B) can be synthesized via the <Step 2>, i.e. a method of thermally decomposing or/and hydrolyzing a compound represented by formula (II). First, the following is a description of synthetic method of the compound represented by formula (III-A) by thermally decomposition of a compound represented by formula (II).

As the thermal decomposition, there can be exemplified a method of heating a substrate as it is, and a method of heating a substrate in the presence of a metal fluoride. As a method of heating a substrate as it is to decompose the same, use may be made of arbitrary method, such as a known method (for example, a method described in J. Am. Chem. Soc. 1998, 120, 7117). Namely, said method is a method of isolating a reaction product by a distillation operation, after decomposition at an external temperature of 200° C. or more. As a method of heating a substrate in the presence of a metal fluoride, use may be made of arbitrary method, such as a known method (for example, a method described in J. Fluorine. Chem. 2001, 112, 109). This method is to cause thermal decomposition at about 100° C. to 150° C., by using a metal fluoride. Examples of the metal fluoride that can be used include sodium fluoride, potassium fluoride and cesium fluoride. Especially, sodium fluoride is most preferable from an economical viewpoint. The amount to be used of the catalyst is preferably in the range of from 0.010 to 1.0 molar equivalent, and most preferably from 0.10 to 0.50 molar equivalent, based on the compound represented by formula (II). Further, there is a possibility that acid chlorides, acid bromides and acid iodides are obtained using another metal halide (e.g., sodium chloride, sodium bromide, sodium iodide) as a catalyst. A reaction time is not univocally determined because it depends on a reactivity of the substrate and reaction conditions, but generally the reaction time is in the range of from 0.5 to 10 hours.

Next, the following is a description of synthetic method of the compound represented by formula (III-B) by hydrolysis of the compound represented by formula (II). As a method of hydrolysis, use may be made of arbitrary method. For example, examples thereof include a method of mixing a compound represented by formula (II) and an alkaline aqueous solution; a method of subjecting a compound represented by formula (II) react with an alcohol to esterify said compound, followed by mixing with an alkaline aqueous solution; and a method of thermally decomposing a compound represented by formula (II), to convert into a compound represented by formula (III-A), followed by mixing with an alkaline aqueous solution. Of these methods, preferred are the method of reacting a compound represented by formula (II) with an alcohol to esterify the compound, followed by mixing with an alkaline aqueous solution; and the method of thermally decomposing a compound represented by formula (II), to convert into a compound represented by formula (III-A), followed by mixing with an alkaline aqueous solution, from the viewpoint that a high purity of the compound represented by formula (III-B) can be synthesized. Examples of the alkaline aqueous solution that can be used include a sodium hydroxide aqueous solution, a potassium hydroxide aqueous solution and a cesium hydroxide aqueous solution. A sodium hydroxide aqueous solution is especially preferable. Addition of the alkaline aqueous solution is preferably continued up to just before an indicator (e.g., a phenolphthalein solution) indicates alkaline. If the addition is still continued longer, there is a possibility that the alkaline aqueous solution might adversely affect to the following thermal decomposition step. After hydrolysis, the compound represented by formula (III-B) can be obtained by evaporation of the solvent(s) used.

Next, the following is a detailed description of synthetic method of the compound represented by formula (IV) or (IVa). The compound represented by formula (IV) can be synthesized via the <Step 3-1> (the step of thermally decomposing a compound represented by formula (III-A) or (III-B)) or the <Step 3-2> (the step of thermally decomposing a compound represented by formula (II)). First, the following is a detailed explanation of thermal decomposition of a compound represented by formula (II) or (III-A).

The thermal decomposition of a compound represented by formula (II) or (III-A) is preferably carried out using a gas phase reaction or a liquid phase reaction. Especially, the thermal decomposition is preferably performed using a gas phase reaction. The reaction is preferably conducted in the presence of an inactive gas. Examples of the inactive gas include nitrogen, helium and argon. The inactive gas is preferably used in an amount of from 0.01 to 50 volume equivalent, based on the compound represented by formula (II) or (III-A). It is preferable that the gas phase reaction is successively conducted using a tube type reactor. A reaction temperature is not univocally determined because the temperature is affected by structures of the compound represented by formula (II) or (III-A). The reaction temperature is preferably in the range of from 150° C. to 500° C., and most preferably from 200° C. to 450° C. When the tube type reactor is used, a retention time is preferably in the range of from 0.1 second to 10 minutes in terms of superficial standard. A reaction pressure is not limited in particular, but the reaction is preferably performed in the range of from 0.01 to 1.0 MPa. It is preferable from a viewpoint of reaction acceleration that a thermal decomposition using a tube type reactor is carried out in a reaction tube filled with glass, a metal salt, or the like. Particularly, exemplary metal salts include carbonates (e.g., lithium carbonate, sodium carbonate, potassium carbonate, cesium carbonate, calcium carbonate), and metal halides (e.g., sodium fluoride, potassium fluoride, sodium chloride, potassium chloride). Of these metal salts, sodium carbonate and potassium carbonate are most preferable. A particle size of these fillers is preferably in the range of from 10 to 1,000 μm, and most preferably from 100 to 500 μm. It is preferable from a viewpoint of improvement in selectivity of reaction that the fillers have been dehydrated before use, by a method of blowing an inactive gas at the reaction temperature or around, or other equivalent methods. The compound represented by formula (IV) or (IVa) produced by thermal decomposition, can be collected, by cooling at the vicinity of the exit of a reactor.

Next, the following is a detailed explanation of the thermal decomposition of a compound represented by formula (III-B).

The thermal decomposition of a compound represented by formula (III-B) can be accomplished by heating a solid of the compound represented by formula (III-B). It is preferable to heat the solid while stirring. A reaction temperature is not univocally determined because the temperature is affected by structures of the compound represented by formula (III-B). The reaction temperature is preferably in the range of from 150° C. to 500° C., and most preferably from 200° C. to 450° C. The reaction is preferably conducted in the presence of an inactive gas. Examples of the inactive gas are the same as described above. A reaction time depends on reaction conditions, but generally the reaction time is in the range of from 0.1 to 10 hours. It is preferable that a reactor is equipped with a cooling-device at the vicinity of the exit of the reactor so that the thus-produced compound represented by formula (IV) or (IVa) can be collected continuously.

According to the above-described method, the fluorine-containing 3,5-oxo-1,6-heptadiene derivative compound represented by formula (IV) or (IVa) can be produced inexpensively and efficiently.

Next, a polymer of the present invention is explained.

The polymer of the present invention is a polymer containing at least one of the repeating units represented by formula (VI-1) or (VI-2) that is obtained by polymerizing at least one of the compound represented by formula (IV) produced according to the above-described method. The polymer may be a homopolymer of the compound represented by formula (IV), or a copolymer derived from at least one of the compound represented by formula (IV). A preferable mass average molecular weight of the polymer is in the range of from 1,000 to 100,000, and more preferably from 5,000 to 50,000. The molecular weight may be determined using a size-excluding chromatography (GPC) (equipment: SEC HLC-8020 (trade name) made by TOSO, molecular weight conversion standard sample: polymethyl methacrylate).

A method of producing the polymer of the present invention is explained below.

The polymerization reaction usable in the present invention is not limited in particular, but radical polymerization is especially preferably used. As the radical polymerization, there may be exemplified a method of irradiating light, a method of using a polymerization initiator, with the latter of using a polymerization initiator being preferable. As the polymerization initiator, use may be made of a usual radical initiator for radical polymerization. Preferable examples of the polymerization initiator include organic peroxides (e.g., diisopropyl peroxydicarbonate, tert-butyl peroxide, lauroyl peroxide, benzoyl peroxide, $(C_3F_7COO-)_2$, $(C_4F_9COO-)_2$, $(C_6F_5COO-)_2$, $(C_6F_{13}COO-)_2$, $((CF_3)_3CO-)_2$), inorganic peroxides (e.g., $K_2S_2O_8$, $Na_2S_2O_8$, $(NH_4)_2S_2O_8$), azo compounds (e.g., azobisisobutyronitrile, 2,2'-azobis(2-aminopropane)dihydrochloride, 4,4'-azobis(4-cyanopentanoic acid), 4,4'-azobis(2-perfluorooctylethyl 4-cyanopentanoate)), and metal peroxide-series (e.g., iron (II) ion-hydrogen peroxide).

Examples of the polymerization method include those of bulk polymerization, solution polymerization, suspension polymerization, and emulsion polymerization. Any of these polymerization methods may be used without any particular limitation. Examples of a solvent when said solvent is used in the polymerization reaction, include water, sulfoxides (e.g., dimethyl sulfoxide), ketones (e.g., acetone, methyl ethyl ketone), esters (e.g., ethyl acetate, butyl acetate, ethyl propionate), ethers (e.g., diethyl ether, dibutyl ether, tetrahydrofuran), aliphatic hydrocarbons (e.g., pentane, hexane), aromatic hydrocarbons (e.g., toluene, xylene, mesitylene), nitriles (e.g., acetonitrile, propionenitrile), amides (e.g., N,N-dimethylformamide, N,N-dimethylacetamide, N-methylpyrrolidone), carboxylic acids (e.g., acetic acid, propionic acid), alcohols (e.g., methanol, ethanol, isopropanol, n-butanol, 3-methylbutanol), fluorine-containing solvents {for example, perfluoro alkanes (which may be a mixture composed of structural isomers, e.g. perfluoropentane, perfluorohexane, perfluoroheptane, and perfluorooctane), perfluoro cycloalkanes (which may be a mixture composed of structural isomers, e.g. perfluorocyclopentane, perfluorocyclohexane, perfluorocycloheptane, and perfluorocyclooctane), perfluoro ethers (which may be a mixture composed of structural isomers, e.g. Fluoriner™ FC-75 (trade name, manufactured by 3M Co.), and Krytox™ (trade name, manufactured by Du Pont Co.)), perfluoro alkylamines (which may be a mixture composed of structural isomers, e.g. perfluorotributylamine)}. These solvents for use in the polymerization reaction may be used singly, or in combination of two or more of those as a mixture solvent.

A temperature of the polymerization reaction is not limited in particular, but the polymerization is preferably carried out at a temperature in the range of from −30° C. to 200° C., and most preferably from 0° C. to 150° C. A pressure (internal pressure) of the polymerization reaction is not limited in particular, but a preferable pressure is in the range of from normal pressure to 5 MPa, and most preferably from normal pressure to 2 MPa. The polymerization reaction can be classified into homopolymerization (polymerization of only one kind of the compound represented by formula (I)) and copolymerization (polymerization in a system wherein two or more kinds of monomers coexist). When one of the compounds represented by formula (I) is co-polymerized with another monomer, examples of the another monomer include compounds represented by formula (I) other than said one, as well as hydrocarbon monomers {for example, olefins (e.g., ethylene, propylene), vinyl-series (e.g., vinyl chloride, vinyl acetate), conjugated esters (e.g., methyl acrylate, methyl methacrylate), cyclic olefins (e.g., 2-norbornene, cyclopentene), conjugated dienes (e.g., butadiene, isobutene), acetylenes (e.g., acetylene, dimethyl acetylenedicarboxylate)}, and fluorine-containing monomers {for example, fluorine-containing olefins (e.g., tetrafluoroethylene, vinylidene fluoride, chlorotrifluoroethylene), fluorine-containing alkyl vinyl ethers (e.g., perfluoropropyl vinyl ether), fluorine-containing cyclic olefins (e.g., perfluoro(2,2-dimethyl-1,3-dioxonol))}. Of these monomers, especially preferred are olefins, cyclic olefins, fluorine-containing olefins, and fluorine-containing cyclic olefins. In the case of copolymerization, the another monomer may be a single monomer, or alternatively a mixture of two or more kinds of the monomers. A monomer composition ratio in copolymerization may be controlled, for example, by a molar ratio of monomers to be used, and reaction conditions.

According to the present invention, a method of producing safely and effectively a fluorine-containing 3,5-oxo-1,6-heptadiene derivative including $CF_2=CF-O-CF_2-O-CF=CF_2$, can be provided.

According to the producing method of the present invention, a fluorine-containing 3,5-oxo-1,6-heptadiene derivative compound represented by formula (IV) can be produced inexpensively and effectively. Further, the present invention is able to provide various kinds of fluorine-containing 3,5-oxo-1,6-heptadiene derivatives, other than the compound of the formula (VI) in which the moiety sandwiched with two oxygen atoms is $-CF_2-$, i.e. $CF_2=CF-O-CF_2-O-CF=CF_2$.

The fluorine-containing 3,5-oxo-1,6-heptadiene derivative of the present invention can undergo cyclic polymerization without causing gelation. Resultantly, the polymer obtained by using said fluorine-containing 3,5-oxo-1,6-heptadiene derivative of the present invention as a raw material, is excellent in transparency, solubility in solvent, chemical stability, and thermal stability.

The present invention will be described in more detail based on the following examples, but the invention is not intended to be limited thereto.

EXAMPLES

Example 1

Preparation of Exemplified Compound (IV-2)

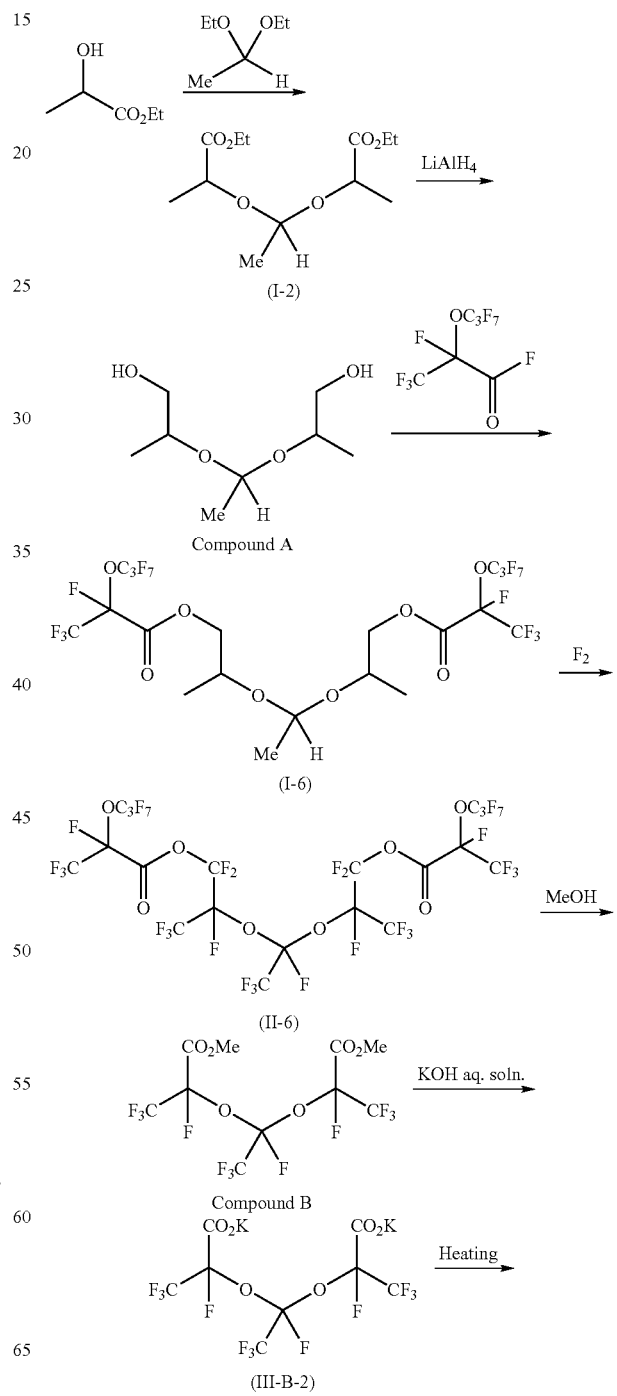

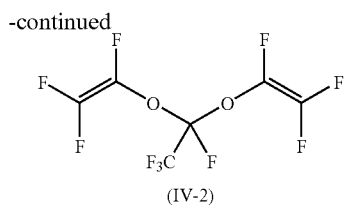

(IV-2)

(1-1) Preparation of Exemplified Compound (I-2)

To a reactor equipped with a Dimroth cooling tube (condenser) and a Dean-Stark tube, 21.5 g (0.113 mol) of para-toluene sulfonic acid monohydrate, 9.1 mL (0.113 mol) of pyridine, and 400 mL of hexane were added, followed by heating at the external temperature of 140° C. for 1 hour. As a result of the heating, about 2.0 mL of water was removed from the reaction system. After standing to cool of the resultant mixture, 490 g (4.15 mol) of ethyl lactate, and 133.5 g (1.13 mol) of 1,1-diethoxyethane were added thereto, followed by heating at the external temperature of 100° C. for 10 hours. At the time of the heating, a volatilized reaction liquid was removed from the reaction system, while adding hexane to said reaction system. Upon that operation, a total of 3.0 L of hexane was used. After termination of the reaction, 9.5 g (0.113 mol) of sodium bicarbonate was added thereto. Then, 200 mL of a saturated sodium bicarbonate solution was added thereto, to wash the organic layer. The organic layer was further washed eight times with 200 mL of water. The thus-washed organic layer was concentrated, and then distilled under reduced pressure, thereby to obtain 114.8 g (0.438 mol, yield 39%) of Exemplified compound (I-2).

The below-shown are identification data of the Exemplified compound (I-2).

$^1$H NMR (300 MHz, CDCl$_3$): δ 1.24 to 1.44 (m, 15H), 4.14 to 4.25 (m, 4H), 4.31 to 4.40 (m, 1H), 4.14 to 4.25, 4.51 to 4.59 (m, 1H), 4.81 to 4.94 (m, 1H) Boiling point 94° C./3 mmHg (1-2) Preparation of Exemplified Compound (I-6)

To 20 mL of tetrahydrofuran, LiAlH$_4$ (1.08 g, 28.5 mmol) was added, under a nitrogen atmosphere. Then, to the resultant solution, was added, dropwise, a mixture solution of Exemplified compound (I-2) (5.0 g, 19.0 mmol) and 10 mL of tetrahydrofuran, while keeping an internal temperature in the range of from 0° C. to 10° C. After completion of the dropwise addition, the internal temperature was elevated to the temperature of from 20° C. to 30° C., and the reaction mixture was stirred for 1 hour. Then, 3.3 mL of water (183 mmol) was added, dropwise, thereto, followed by addition of 1.25 g (8.8 mmol) of sodium sulfate. After stirring for 10 minutes, 20 mL of methanol was added thereto, followed by stirring further for 10 minutes. The thus-obtained reaction mixture was filtrated through cerite. The filtrate was concentrated, thereby to obtain 3.86 g of unpurified Compound A.

The below-shown is identification data of the Compound A.

$^1$H NMR (300 MHz, CDCl$_3$): δ 1.08 to 1.21 (m, 6H), 1.36 to 1.41 (m, 3H), 3.41 to 3.61 (m, 4H), 3.78 to 3.92 (m, 2H), 4.66 to 4.73, 4.83 to 4.90, 4.93 to 4.99 (m, 1H)

To the thus-obtained unpurified Compound A (3.86 g), were added 20 mL of tetrahydrofuran and 4.6 mL (57 mmol) of pyridine. Then, 15.1 g (45.6 mmol) of C$_3$F$_7$OCF(CF$_3$)COF was added, dropwise, while keeping an internal temperature in the range of from 0° C. to 10° C. After completion of the dropwise addition, the internal temperature was elevated to a temperature in the range of from 20° C. to 30° C., and the reaction mixture was stirred for 1 hour. Then, 50 mL of a saturated sodium bicarbonate aqueous solution was added thereto, dropwise, and then 50 mL of ethyl acetate was added, followed by separation. Then, concentration of the resultant mixture was conducted, thereby to obtain 13.6 g (16.9 mmol, 89%) of Exemplified compound (I-6).

The below-shown are identification data of the Exemplified compound (I-6).

$^1$H NMR (300 MHz, CDCl$_3$): δ 1.18 to 1.31 (m, 9H), 3.90 to 4.09 (m, 2H), 4.14 to 4.49 (m, 4H), 4.78 to 4.90 (m, 1H)

$^{19}$F NMR (282.4 MHz, CDCl$_3$): δ −131.85 (m, 2F), −129.75 (s, 2F), −86.64 (m, 2F), −86.11 (m, 2F), −82.17, −82.09 (s (doublet), 3F), −81.40 (s, 3F), −80.33 (m, 2F), −79.79 (m, 2F)

(1-3) Preparation of Exemplified Compound (II-6)

In a reactor, 175 mL of FC-72 (trade name, manufactured by 3M) was placed. At the exit of the reactor, were equipped a NaF-pellet-filling layer and a condenser kept at −40° C. connected in series, so that a liquid condensed by the condenser would be returned to the reactor through a recirculation line. After blowing a helium gas at a speed of 20 mL/min for 30 min thereinto, a fluorine gas diluted to 20% with a nitrogen gas (hereinafter simply referred to as a 'fluorine gas') was blown at a speed of 30 mL/min for 1 hour thereinto. Then, the flow velocity of the fluorine gas was changed to 150 mL/min, and 25 mL of a solution of Exemplified compound (I-6) (5.0 mmol, 4.01 g) dissolved in FC-72 was introduced to the reactor at a flow velocity of 15.0 mL/hour. Then, 10 mL of a solution of hexafluorobenzene (1.50 g, 9.67 mmol) dissolved in FC-72 was injected thereinto at a speed of 10 mL/hour. After carrying out reaction, a peak of Exemplified compound (II-6) was observed by GLC measurement. Stopping to blow the fluorine gas, a helium gas was blown thereinto at a speed of 20 mL/min for 1 hour. Then, a solvent was concentrated and distilled off, thereby to obtain 3.64 g (3.34 mmol, yield 66%) of Exemplified compound (II-6).

The below-shown are identification data of the Exemplified compound (II-6).

$^{19}$F NMR (282.4 MHz, CDCl$_3$): δ −145.5 (brs, 2F), −131.40 (s, 2F), −129.85 (s, 4F), −87.20 to −85.91 (m, 3F), −84.87 (s, 2F), −83.72, −83.46 (s (doublet), 2F), −81.86 to −80.78 (m, 15F), −80.43 to −80.11, −79.89 to −79.42 (m, 8F) Boiling point 115° C./10 mmHg (1-4) Preparation of Exemplified Compound (III-B-2)

To 10 mL of dehydrated MeOH, was gradually added 3.64 g (3.34 mmol) of Exemplified compound (II-6). A generated hydrogen fluoride was excreted from the reaction system, by bubbling of the reaction solution with nitrogen, and collected by an alkaline aqueous solution trap. After stirring for 1 hour, the reaction solution was concentrated and then distilled under reduced pressure, thereby to obtain 1.02 g (2.26 mmol, yield 68%) of Compound B.

The below-shown are identification data of the Compound B.

$^1$H NMR (300 MHz, CDCl$_3$): δ 3.97, 3.98 (s (doublet), 6H)

$^{19}$F NMR (282.4 MHz, CDCl$_3$): δ −132.25 to −132.10, −131.50 to −131.35, −130.57 to −130.51, −129.38 to −129.23 (m (quartet), 2F), −96.11 to −96.00, −91.36 to −91.26, −89.31 to −89.21 (t (triplet), 1F), −82.50 to −82.44, −84.42 to −84.32 (m (doublet), 3F), −82.50 to −82.44, −82.33 to −82.30, −82.02 to −81.98 (m (triplet), 6F) Boiling point 93° C./30 mmHg Compound B (1.02 g, 2.26 mmol) was dissolved in 10 mL of methanol. To the solution, was added a drop of phenolphthalein solution. Thereto, a 20-% potassium hydroxide aqueous solution was added, dropwise. When 1.30 mL of the potassium hydroxide aqueous solution was added, the phenolphthalein solution colored into pale red. The reaction solution was concentrated, and the thus-obtained solid was dried in vacuum for 24 hours, thereby to obtain 1.10 g (2.21 mmol, yield 98%) of Exemplified compound (III-B-2).

(1-5) Preparation of Exemplified Compound (IV-2)

Exemplified compound (III-B-2) (1.10 g, 2.21 mmol) was placed in a reactor. Stirring with a stirrer, a pressure of the reactor was reduced to 50 mmHg. Then, the reactor was heated at 240° C. for 1 hour, to cause reaction. The reaction product was collected by a dry ice methanol trap. The reaction product was distilled, thereby to obtain 0.40 g (1.36 mmol, yield 62%) of Exemplified compound (IV-2).

Example 2

Preparation of Exemplified Compound (IV-2) (Another Method Which is Different from Example 1)

(2-1) Preparation of Exemplified Compound (III-B-2)

To 3.04 g (2.78 mmol) of Exemplified compound (II-6), was added 0.20 g (3.4 mmol) of potassium fluoride (a spray-dried product), and then the resultant mixture was heated at 100° C. for 5 hours. After standing to cool, the reaction mixture was distilled by a distilling column equipped to the reactor, thereby to obtain 0.54 g (1.26 mmol, yield 45%) of Exemplified compound (III-A-5).

Then, 0.54 g (1.26 mmol) of Exemplified compound (III-A-5) was dissolved in 10 mL of methanol. To the solution, was added a drop of phenolphthalein solution. Then, a 20-% potassium hydroxide aqueous solution was added slowly. When 0.80 mL of the potassium hydroxide aqueous solution was added, the phenolphthalein solution colored into pale red. The reaction solution was concentrated, and the thus-obtained solid was dried in vacuum for 24 hours, thereby to obtain 0.50 g (1.04 mmol, yield 83%) of Exemplified compound (III-B-2).

(2-2) Preparation of Exemplified Compound (IV-2)

Exemplified compound (III-B-2) (0.50 g, 1.04 mmol) was placed in a reactor. Stirring with a stirrer, a pressure of the reactor was reduced to 50 mmHg. Then, the reactor was heated at 240° C. for 1 hour, to carry out reaction. The reaction product was collected by a dry ice methanol trap. The reaction product was distilled, thereby to obtain 0.13 g (0.44 mmol, yield 42%) of Exemplified compound (IV-2).

Example 3

Preparation of Polymer

A perfluoropropionyl peroxide solution (0.012 mmol) was added to 0.35 g (1.20 mmol) of Exemplified compound (IV-2), and then the resultant mixture was cooled to −196° C. with liquid nitrogen. After reduction of pressure, the temperature of the mixture was returned to the room temperature, and then nitrogen was introduced thereto. Such an operation was repeated three times in total. Then, the reaction temperature was elevated to 50° C., and the resultant reaction mixture was heated for 36 hours, thereby to obtain 0.20 g of a polymer. A molecular weight of the thus-obtained polymer was determined to be Mw 18,500 by GPC measurement.

Having described our invention as related to the present embodiments, it is our intention that the invention not be limited by any of the details of the description, unless otherwise specified, but rather be construed broadly within its spirit and scope as set out in the accompanying claims.

This non-provisional application claims priority under 35 U.S.C. § 119 (a) on Patent Application No. 2006-069882 filed in Japan on Mar. 14, 2006, which is entirely herein incorporated by reference.

What is claimed is:

1. A method of producing a compound represented by formula (IV), comprising: <Step 1>, <Step 2>, and <Step 3-1>, each described below:

<Step 1> subjecting a compound represented by formula (I) to fluorination, to obtain a compound represented by formula (II);

<Step 2> subjecting the compound represented by formula (II) to at least one of thermal decomposition and hydrolysis, to obtain a compound represented by formula (III-A) or (III-B); and <Step 3-1> subjecting the compound represented by formula (III-A) or (III-B) to thermal decomposition, to obtain the compound represented by formula (IV):

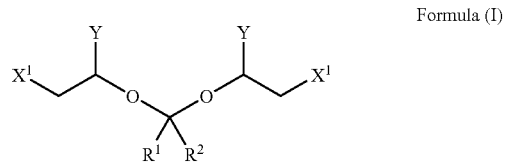

Formula (I)

wherein, in formula (I), $R^1$ and $R^2$, which are the same or different from each other, each independently represent a hydrogen atom, a halogen atom, an alkyl group, a cycloalkyl group, an alkenyl group, an alkynyl group, an aryl group, or an alkoxycarbonyl group, or $R^1$ and $R^2$ may bond together to form a ring; $X^1$ represents a hydrogen atom or a halogen atom; and Y represents an alkoxycarbonyl group, or —$CH_2OCOR^3$, in which $R^3$ represents an alkyl group, a cycloalkyl group, or an aryl group;

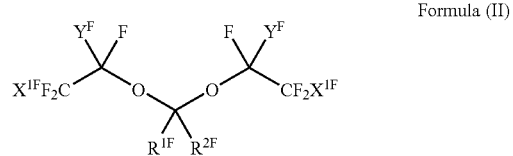

Formula (II)

wherein, in formula (II), $R^{1F}$ and $R^{2F}$, which are the same or different from each other, each independently represent a halogen atom, a fluorine-containing alkyl group, a fluorine-containing cycloalkyl group, or a fluorine-containing alkoxy group, or $R^{1F}$ and $R^{2F}$ may bond together to form a ring; $X^{1F}$ represents a halogen atom; $Y^F$ represents a fluorine-containing alkoxycarbonyl group, or —$CF_2OCOR^{3F}$, in which $R^{3F}$ represents a fluorine-containing alkyl group or a fluorine-containing cycloalkyl group; and when $X^1$, Y, $R^1$ and $R^2$ in formula (I) do not change before and after the <Step 1>, $X^{1F}$, $Y^F$, $R^{1F}$ and $R^{2F}$ have the same meanings as $X^1$, Y, $R^1$ and $R^2$ in formula (I), respectively;

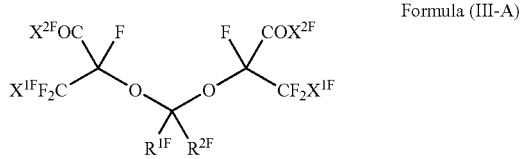

Formula (III-A)

wherein, in formula (III-A), $X^{1F}$, $R^{1F}$ and $R^{2F}$ have the same meanings as those in formula (II), respectively; $X^{1F}$ represents a halogen atom; $R^{1F}$ and $R^{2F}$, which are the same or different from each other, each independently represent a halogen atom, a fluorine-containing alkyl group, a fluorine-containing cycloalkyl group, or a fluorine-containing alkoxy group, or $R^{1F}$ and $R^{2F}$ may bond together to form a ring; and $X^{2F}$ represents a halogen atom;

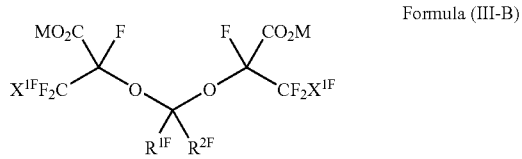

Formula (III-B)

wherein, in formula (III-B), $X^{1F}$, $R^{1F}$ and $R^{2F}$ have the same meanings as those in formula (II), respectively; $X^{1F}$ represents a halogen atom; $R^{1F}$ and $R^{2F}$, which are the same or different from each other, each independently represent a halogen atom, a fluorine-containing alkyl group, a fluorine-containing cycloalkyl group, or a fluorine-containing alkoxy group, or $R^{1F}$ and $R^{2F}$ may bond together to form a ring; and M represents a metal compound;

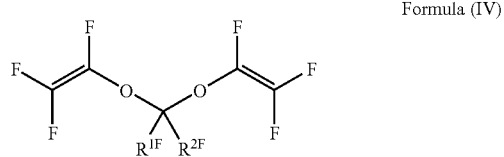

Formula (IV)

wherein, in formula (IV), $R^{1F}$ and $R^{2F}$ have the same meanings as those in formula (II), respectively, and $R^{1F}$ and $R^{2F}$, which are the same or different from each other, each independently represent a halogen atom, a fluorine-containing alkyl group, a fluorine-containing cycloalkyl group, or a fluorine-containing alkoxy group, or $R^{1F}$ and $R^{2F}$ may bond together to form a ring.

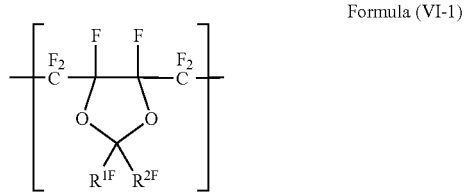

Formula (VI-1)

-continued

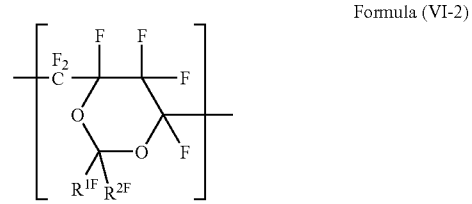

Formula (VI-2)

2. A method of producing a compound represented by formula (IV), comprising: <Step 1> and <Step 3-2>, each described below:

<Step 1> subjecting a compound represented by formula (I) to fluorination, to obtain a compound represented by formula (II); and <Step 3-2> subjecting the compound represented by formula (II) to thermal decomposition, to obtain the compound represented by formula (IV):

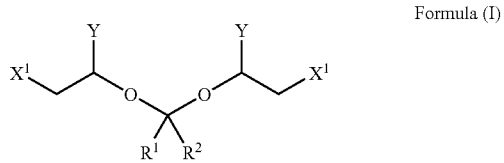

Formula (I)

wherein, in formula (I), $R^1$ and $R^2$, which are the same or different from each other, each independently represent a hydrogen atom, a halogen atom, an alkyl group, a cycloalkyl group, an alkenyl group, an alkynyl group, an aryl group, or an alkoxycarbonyl group, or $R^1$ and $R^2$ may bond together to form a ring; $X^1$ represents a hydrogen atom or a halogen atom; and Y represents an alkoxycarbonyl group, or —$CH_2OCOR^3$, in which $R^3$ represents an alkyl group, a cycloalkyl group, or an aryl group;

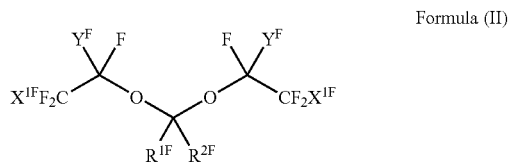

Formula (II)

wherein, in formula (II), $R^{1F}$ and $R^{2F}$, which are the same or different from each other, each independently represent a halogen atom, a fluorine-containing alkyl group, a fluorine-containing cycloalkyl group, or a fluorine-containing alkoxy group, or $R^{1F}$ and $R^{2F}$ may bond together to form a ring; $X^{1F}$ represents a halogen atom; $Y^F$ represents a fluorine-containing alkoxycarbonyl group, or —$CF_2OCOR^{3F}$, in which $R^{3F}$ represents a fluorine-containing alkyl group or a fluorine-containing cycloalkyl group; and when $X^1$, Y, $R^1$ and $R^2$ in formula (I) do not change before and after the <Step 1>, $X^{1F}$, $Y^F$, $R^{1F}$ and $R^{2F}$ have the same meanings as $X^1$, Y, $R^1$ and $R^2$ in formula (I), respectively;

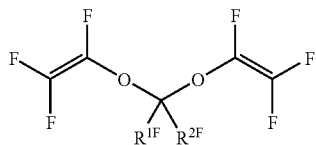

Formula (IV)

wherein, in formula (IV), $R^{1F}$ and $R^{2F}$ have the same meanings as those in formula (II), respectively, and $R^{1F}$ and $R^{2F}$, which are the same or different from each other, each independently represent a halogen atom, a fluorine-containing alkyl group, a fluorine-containing cycloalkyl group, or a fluorine-containing alkoxy group, or $R^{1F}$ and $R^{2F}$ may bond together to form a ring.

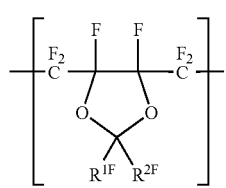

Formula (VI-1)

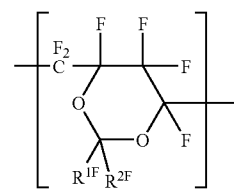

Formula (VI-2)

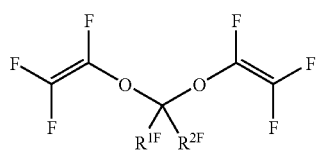

Formula (IVa)

* * * * *